US009294906B2

(12) United States Patent
Kim et al.

(10) Patent No.: US 9,294,906 B2
(45) Date of Patent: Mar. 22, 2016

(54) METHOD AND DEVICE FOR SUPPORTING VOICE SERVICE IN WIRELESS COMMUNICATION SYSTEM

(71) Applicant: LG ELECTRONICS INC., Seoul (KR)

(72) Inventors: Laeyoung Kim, Anyang-si (KR); Jaehyun Kim, Anyang-si (KR); Taehyeon Kim, Anyang-si (KR); Hyunsook Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/378,490

(22) PCT Filed: Feb. 22, 2013

(86) PCT No.: PCT/KR2013/001430
§ 371 (c)(1),
(2) Date: Aug. 13, 2014

(87) PCT Pub. No.: WO2013/125896
PCT Pub. Date: Aug. 29, 2013

(65) Prior Publication Data
US 2015/0056986 A1    Feb. 26, 2015

Related U.S. Application Data

(60) Provisional application No. 61/601,565, filed on Feb. 22, 2012, provisional application No. 61/619,431,
(Continued)

(51) Int. Cl.
*H04W 8/02* (2009.01)
*H04L 29/08* (2006.01)
(Continued)

(52) U.S. Cl.
CPC ............... *H04W 8/02* (2013.01); *H04L 65/103* (2013.01); *H04L 65/104* (2013.01);
(Continued)

(58) Field of Classification Search
CPC ......... H04W 8/02; H04W 76/02; H04L 67/10
USPC .......................................... 455/432.1, 422.1
See application file for complete search history.

(56) References Cited

U.S. PATENT DOCUMENTS 8,422,457 B2 * 4/2013 Dwyer et al. .................. 370/331
2012/0327852 A1 * 12/2012 Zisimopoulos et al. ...... 370/328

FOREIGN PATENT DOCUMENTS

JP         2013-517732 A      5/2013
WO    WO 2011/087331 A2     7/2011

OTHER PUBLICATIONS

3GPP, "General Packet Radio Service (GPRS) enhancements for Evolved Universal Terrestrial Radio Access Network (E-UTRAN) access (3GPP TS 23.401 version 10.4 Release 10)", ETSI TS 123 401 V10.4.0, Jun. 2011, 284 pages.

(Continued)

*Primary Examiner* — Michael Neff
(74) *Attorney, Agent, or Firm* — Birch, Stewart, Kolasch & Birch, LLP

(57) ABSTRACT

An embodiment of the present invention relates to a method for supporting a voice service for a network terminal in a wireless communication system. The method includes transmitting an update location request (ULR) message to a home subscriber server (HSS) by a serving node, wherein if the serving node may not evaluate an IP multimedia subsystem (IMS) voice over PS session-supported indication value for the terminal, the ULR has no information on homogeneous support of IMS voice in a PS session.

15 Claims, 9 Drawing Sheets

Related U.S. Application Data filed on Apr. 3, 2012, provisional application No. 61/620,411, filed on Apr. 4, 2012, provisional application No. 61/620,968, filed on Apr. 5, 2012, provisional application No. 61/621,575, filed on Apr. 9, 2012, provisional application No. 61/643,862, filed on May 7, 2012.

(51) Int. Cl.
*H04L 29/06* (2006.01)
*H04W 76/02* (2009.01)
*H04W 76/04* (2009.01)

(52) U.S. Cl.
CPC ....... *H04L 65/1016* (2013.01); *H04L 65/1069* (2013.01); *H04L 65/1073* (2013.01); *H04L 67/10* (2013.01); *H04W 76/022* (2013.01); *H04W 76/041* (2013.01)

(56) References Cited

OTHER PUBLICATIONS

Ericsson et al., "Mismatch between SRVCC capability indicator and FGI bits and related issues", S2-114796, SA WG2 Meeting #88, Nov. 14-18, 2011, San Francisco, USA, pp. 1-12.

Ericsson et al., "UE AS capability request over S1", S2-121152, 3GPP TSG-SA2 Meeting #89, Vancouver, Canada, Feb. 14-18, 2012, pp. 1-33.

NEC, "IMS Voice Support Indication in the GUTI Reallocation", S2-096114, 3GPP TSG SA WG2 Meeting #75E (Electronic), Oct. 21-28, 2009, Elbonia, 4 pages.

3GPP TS 29.272, 3rd Generation Partnership Project; Technical Specification Group Core Network and Terminals; Evolved Packet System (EPS); Mobility Management Entity (MME) and Serving GPRS Support Node . . . protocol, (Release 11), vol. 11.1.0, Dec. 17, 2011, pp. 1-98, XP050554615.

\* cited by examiner

METHOD AND DEVICE FOR SUPPORTING VOICE SERVICE IN WIRELESS COMMUNICATION SYSTEM

CROSS REFERENCE TO RELATED APPLICATIONS

This application is the National Phase of PCT International Application No. PCT/KR2013/001430, filed on Feb. 22, 2013, which claims priority under 35 U.S.C. 119(e) to U.S. Provisional Application No. 61/601,565, filed on Feb. 22, 2012, U.S. Provisional Application No. 61/619,431, filed on Apr. 3, 2012, U.S. Provisional Application No. 61/620,411, filed on Apr. 4, 2012, U.S. Provisional Application No. 61/620,968, filed on Apr. 5, 2012, U.S. Provisional Application No. 61/621,575, filed on Apr. 9, 2012, and U.S. Provisional Application No. 61/643,862, filed on May 7, 2012, all of which are hereby expressly incorporated by reference into the present application.

TECHNICAL FIELD

The present invention relates to a wireless communication system, and more particularly to a method and apparatus for supporting a voice service.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide correct transmission of a terminating voice call in a wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for supporting a voice service of a user equipment (UE) of a network in a wireless communication system including: transmitting an update location request (ULR) message to a home subscriber server (HSS) by a serving node, wherein, if the serving node does not evaluate an IMS (IP Multimedia Subsystem) voice over PS Session Supported Indication value for the user equipment (UE), the ULR message does not include Homogeneous Support of IMS Voice over PS session information.

In a second technical aspect of the present invention, a serving node apparatus for use in a wireless communication system includes: a transceiver module; and a processor, wherein the processor transmits an update location request (ULR) message to a home subscriber server (HSS) by a serving node, wherein, if the serving node does not evaluate an IMS (IP Multimedia Subsystem) voice over PS Session Supported Indication value for the user equipment (UE), the ULR message does not include Homogeneous Support of IMS Voice over PS session information.

The first and second technical aspects may include all or some parts of the following items.

The IMS voice over PS Session Supported Indication value may be decided in consideration of Voice over IMS related capability information of the UE.

The Voice over IMS capability information may include at least one of a voice support match indicator and single radio voice call continuity (SRVCC) capability information.

If the ULR message does not include the Homogeneous Support of IMS Voice over PS session information, the Homogeneous Support of IMS Voice over PS session information may be transferred after transmission of the ULR message.

The Homogeneous Support of IMS Voice over PS session information transmitted after the ULR transmission may be contained in a Notify Request message transferred from the serving node to the HSS.

If the IMS voice over PS session may be equally supported for the UE in a service area of the serving node, the IMS voice over PS Session Supported Indication information is set to a supported state (Supported).

If the IMS voice over PS session may not be equally supported for the UE in a service area of the serving node, the IMS voice over PS Session Supported Indication information may be set to a not_supported state (Not_Supported).

If the IMS voice over PS session is supported only in some regions from among service regions of the serving node for the UE, the Homogeneous Support of IMS Voice over PS session information may not be considered by the serving node.

If it is impossible to support the IMS voice over PS session in a service region of the serving node for the UE, the Homogeneous Support of IMS Voice over PS session information may not be considered by the serving node.

The Homogeneous Support of IMS Voice over PS session information may be stored in a Mobility Management (MM) context of the serving node.

The ULR transmission step may be contained in any one of an attach procedure of the UE, a Tracking Area Update (TAU) of the UE, or a Routing Area Update (RAU) procedure of the UE.

The serving node may be any one of a Mobility Management Entity (MME) and a Serving GPRS Support Node (SGSN).

If the serving node is a Mobility Management Entity (MME), the service region of the serving node may include all tracking areas (TAs) associated with the MME.

If the serving node is a Serving GPRS Support Node (SGSN), the service region of the serving node may include all routing areas (RAs) associated with the SGSN.

The Homogeneous Support of IMS Voice over PS session information may be used to select a domain of a terminating voice call for the UE.

Advantageous Effects

As is apparent from the above description, the embodiments of the present invention can enable a terminating voice call for a UE belonging to an IMS (IP Multimedia Subsystem) subscriber in an IMS network, to be transferred to a correct domain.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
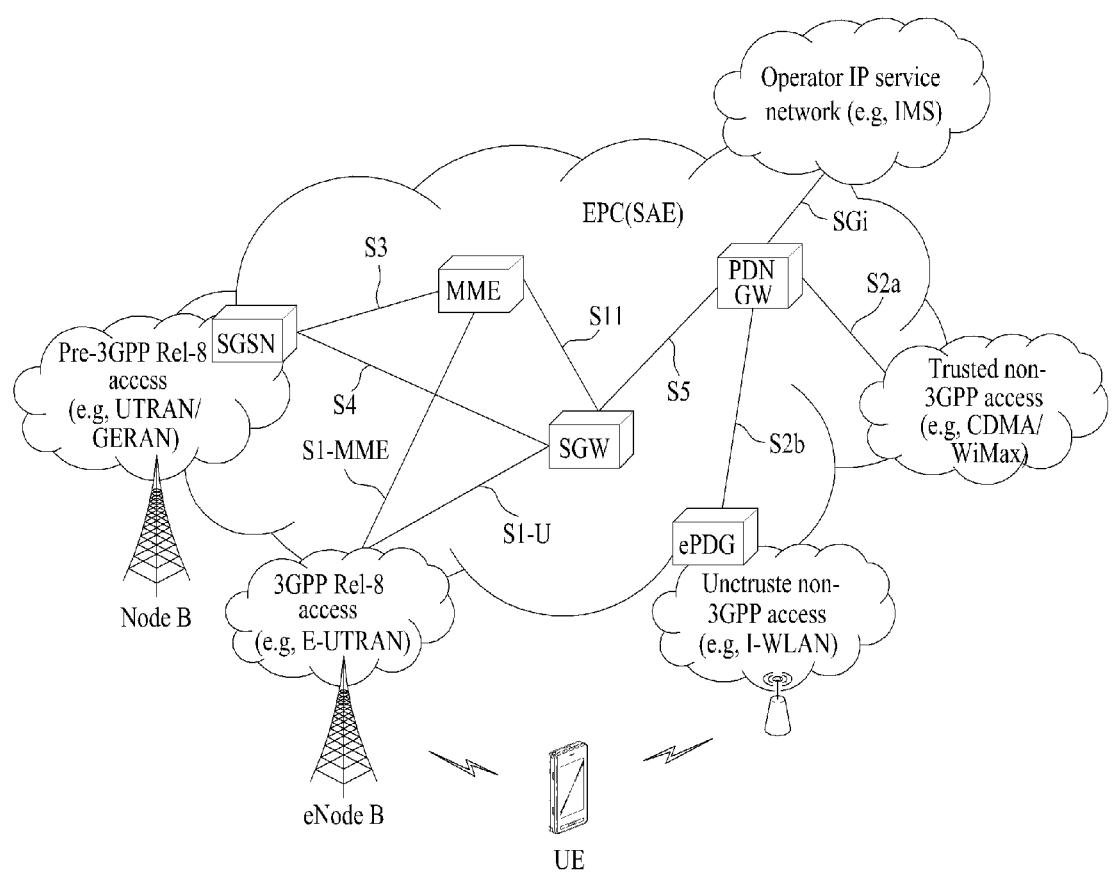
FIG. 1 is a conceptual diagram illustrating an evolved packet system (EPS) including an evolved packet core (EPC).

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Specific terminologies used in the following description are provided to help understand the present invention and the use of the specific terminologies can be modified into a different form in a range of not deviating from the technical idea of the present invention.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Embodiments of the present invention may be supported by the standard documents disclosed in at least one of wireless access systems including IEEE (Institute of Electrical and Electronics Engineers) 802 system, 3GPP system, 3GPP LTE system, 3GPP LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following embodiments of the present invention can be applied to a variety of wireless communication systems. For clarity, the following description focuses on 3GPP LTE and 3GPP LTE-A systems. However, technical features of the present invention are not limited thereto.

Terms used in the following description are defined as follows.

Universal Mobile Telecommunications System (UMTS): UMTS refers to a GSM (Global System for Mobile Communication)-based third generation mobile communication technology developed by the 3GPP.

Evolved Packet System (EPS): EPS refers to a network system including not only an Evolved Packet Core (EPC) serving as an IP-based packet switched core network (CN), but also an access network such as LTE, UTRAN, etc. EPC refers to a network evolved from UMTS.

NodeB: NodeB refers to a base station (BS) of GERAN/UTRAN, which is installed outdoors and has a coverage corresponding to a macro cell.

eNodeB: eNodeB refers to a base station of LTE, which is installed outdoors and has a coverage corresponding to a macro cell.

User Equipment (UE): UE may be referred to as a terminal, a Mobile Equipment (ME), or a Mobile Station (MS), etc. The UE may be a type of portable equipment having a communication function, such as a laptop, a cellular phone, a Personal Digital Assistant (PDA), a smart phone, and a multimedia device, or may be a type of fixed equipment, such as a Personal Computer (PC) or a vehicle-mounted device.

Radio Access Network (RAN): Radio access network (RAN) is a unit including a NodeB, an eNodeB, and a Radio Network Controller (RNC) configured to control the NodeB and eNodeB. RAN is present between a UE and a core network and provides connection to the core network (CN).

Home Location Register (HLR)/Home Subscriber Server (HSS): HLR/HSS is a database including subscriber information of the 3GPP network. HSS may perform various functions, for example, configuration storage, identity management, user state storage, etc.

RAN Application Part (RANAP): RANAP is an interface between nodes (i.e., MME (Mobility Management Entity)/SGSN(Serving GPRS (General Packet Radio Service) Support Node)/MSC (Mobile Switching Center)) configured to control a radio access network (RAN) and a core network (CN).

Public Land Mobile Network (PLMN): PLMN is a network configured to provide a mobile communication service to users. PLMN may be classified according to individual operators.

Non-Access Stratum (NAS): NAS is a functional layer for signaling between a UE and a core network and exchanging a traffic message in a UMTS protocol stack, supports UE mobility, and supports a session management procedure for establishing and maintaining an IP connection between a UE and a PDN GW.

Home NodeB (HNB): HNB is a Customer Premises Equipment (CPE) for providing UMTS Terrestrial Radio Access Network (UTRAN) coverage and, for a detailed description thereof, reference may be made to standard specification TS 25.467.

Home eNodeB (HeNB): HeNB is Customer Premises Equipment (CPE) for providing Evolved-UTRAN (E-UTRAN) coverage and, for a detailed description thereof, reference may be made to standard specification TS 36.300.

Closed Subscriber Group (CSG): CSG is a CSG constituent element of H(e)NB, and is a subscriber group for accessing one or more CSG cells of a Public Land Mobile Network (PLMN).

CSG ID: CSG ID is a unique ID for identifying a CSG within a PLMN range associated with a CSG cell or a CSG cell group and, for a detailed description thereof, reference may be made to standard specification TS 23.003.

Local IP Access (LIPA): LIPA can enable an IP capable UE (i.e., a UE having an IP function) to access an entity having a different IP function in the same residential- or enterprise-IP network via H(e)NB. LIPA traffic does not pass through an operator network. In the 3GPP Release-19 system, LIPA can provide access to resources of a local network (i.e., a network located in the home or office of a customer) via H(e)NB.

Managed Remote Access (MRA): MRA can access an IP capable entity for enabling a CSG user to connect to a home network from a remote site. For example, when using MRA, a user located at an external part of the local network can receive user data services from the corresponding local network.

Selected IP Traffic Offload (SIPTO): In 3GPP Release-10, the operator or enterprise selects a Packet data network GateWay (PGW) located physically close to a UE in the EPC network so that offloading of user traffic is supported.

SIPTO@LN (SIPTO at Local Network): SIPTO@LN is an evolved technology of SIPTO of 3GPP Release-10. SIPTO@LN indicates that user traffic is offloaded (handed over) through a local network located in customer coverage. Unlike LIPA for providing access to resources of the local network, SIPTO@LN can provide access to an external network (e.g., the Internet) via the local network. SIPTO@LN operates on the assumption that the local network is connected to a desired external network.

Packet Data Network (PDN) connection: PDN connection refers to logical connection between a UE denoted by one IP address (one IPv4 address and/or one IPv6 prefix) and a PDN denoted by Access Point Name (APN).

LIPA PDN connection: PDN connection for LIPA of a UE connected to H(e)NB.

LIPA-Permission: LIPA-Permission indicates whether APN is accessible through LIPA, and three values are defined as follows:

LIPA-Prohibited: LIPA-Prohibited may prevent the corresponding APN from being accessed through LIPA. That is, user plane data can be accessed through EPC only.

LIPA-Only: LIPA-Only may enable the corresponding APN to be accessed through LIPA only.

LIPA-Conditional: LIPA-Conditional may enable the corresponding APN to be accessed through the LIPA-Prohibited (or non-LIPA) scheme (i.e., through EPC) or the LIPA scheme.

IP Multimedia Subsystem (IMS): IMS refers to a subsystem for providing IP-based multimedia services.

Application Server (AS): Server for providing various multimedia services.

Multi-media session continuity: Support terminal mobility or mobility between UEs while maintaining session continuity.

Service centralization and continuity application server (SCC AS): Application server supporting multimedia session continuity (see 3GPP TS 23.292 and 3GPP TS 23.237).

Circuit Switched FallBack (CSFB): CSFB refers to a technology for providing a voice and other CS-domain services through an E-UTRAN access UE that falls back to UTRAN/GERAN CS domain access, for a detailed description thereof, reference may be made to standard specification 3GPP TS 23.272.

Hereinafter, a description will be given based on the above-described terms.

FIG. 1 is a conceptual diagram illustrating an evolved packet system (EPS) including an evolved packet core (EPC).

The EPC is a fundamental element of system architecture evolution (SAE) for improving 3GPP performance. SAE corresponds to a research project for deciding a network structure supporting mobility between various types of networks. SAE aims to provide an optimized packet-based system which supports various radio access technologies based on IP and provides improved data transfer capabilities.

More specifically, the EPC is a core network of an IP mobile communication system for a 3GPP LTE system and may support a packet-based real-time and non-real-time service. In the existing mobile communication system (that is, a second or third generation mobile communication system), a core network function was implemented through two distinct sub-domains of a voice network (a circuit-switched (CS) network) and a data network (a packet-switched (PS) network). In a 3GPP LTE system which is evolved from the third generation communication system, sub-domains of a CS network and a PS network were unified into one IP domain. That is, in a 3GPP LTE system, connection between UEs having IP capability may be achieved through an IP based base station (e.g., an eNodeB (evolved Node B)), an EPC, an application domain (e.g., an IMS)). That is, the EPC is a structure necessary to implement an end-to-end IP service.

The EPC may include various components. FIG. 1 shows a serving gateway (SGW), a packet data network gateway (PDN GW), a mobility management entity (MME), a serving GPRS (general packet radio service) (SGSN) support node and an enhanced packet data gateway (ePDG).

The SGW operates as a boundary point between a radio access network (RAN) and a core network and is an element which performs a function for maintaining a data path between an eNodeB and a PDN GW. In addition, if a UE moves over a region served by an eNodeB, the SGW serves as a local mobility anchor point. That is, packets may be routed through the SGW for mobility in an evolved UMTS terrestrial radio access network (E-UTRAN) defined after 3GPP release-8. In addition, the SGW may serve as an anchor point for mobility of another 3GPP network (an RAN defined before 3GPP release-8, e.g., UTRAN or GERAN (global system for mobile communication (GSM)/enhanced data rates for global evolution (EDGE) radio access network).

The PDN GW corresponds to a termination point of a data interface for a packet data network. The PDN GW may support policy enforcement features, packet filtering and charging support. In addition, the PDN GW may serve as an anchor point for mobility management with a 3GPP network and a non-3GPP network (e.g., an untrusted network such as an interworking wireless local area network (I-WLAN) and a trusted network such as a code division multiple access (CDMA) or WiMax network).

Although the SGW and the PDN GW are configured as separate gateways in the example of the network structure of FIG. 1, the two gateways may be implemented according to a single gateway configuration option.

The MME performs signaling and control functions in order to support access to network connection of a UE, network resource allocation, tracking, paging, roaming and handover. The MME controls control plane functions associated with subscriber and session management. The MME manages numerous eNodeBs and signaling for selection of a conventional gateway for handover to other 2G/3G networks. In addition, the MME performs security procedures, terminal-to-network session handling, idle terminal location management, etc.

The SGSN handles all packet data such as mobility management and authentication of a user for other 3GPP networks (e.g., GPRS networks).

The ePDG serves as a security node for a non-3GPP network (e.g., an I-WLAN, a Wi-Fi hotspot, etc.).

As described with reference to FIG. 1, a UE having IP capabilities may access an IP service network (e.g., an IMS) provided by an operator through various elements in the EPC based on 3GPP access or non-3GPP access.

FIG. 1 shows various reference points (e.g., S1-U, S1-MME, etc.). In the 3GPP system, a conceptual link connecting two functions present in different functional entities of an E-UTRAN and an EPC is defined as a reference point. Table 1 shows the reference points shown in FIG. 1. In addition to the example of Table 1, various reference points may be present according to network structure.

TABLE 1

| Reference point | Description |
|---|---|
| S1-MME | Reference point for the control plane protocol between E-UTRAN and MME |
| S1-U | Reference point between E-UTRAN and Serving GW for per bearer user plane tunneling and inter eNodeB path switching during handover |
| S3 | Reference point between MME and SGSN. Enables user and bearer information exchange for inter 3GPP access network mobility in idle and/or active state. This reference point can be used for intra-PLMN or inter-PLMN handover (e.g. in the case of Inter-PLMN HO). |
| S4 | Reference between SGW and SGSN. Provides related control and mobility support between GPRS Core and the 3GPP Anchor function of Serving GW. In addition, if Direct Tunnel is not established, it provides user plane tunneling. |
| S5 | Reference point for providing user plane tunneling and tunnel management between Serving GW and PDN GW. Used for Serving GW relocation due to UE mobility and if the Serving GW needs to connect to a non-co-located PDN GW for the required PDN connectivity. |
| S11 | Reference point between MME and SGW |
| SGi | It is reference point between the PDN GW and the packet data network. Packet data network may be an operator external public or private packet data network or an intra operator packet data network, e.g. for provision of IMS services. This reference point corresponds to Gi for 3GPP access. |

Among the reference points shown in FIG. 1, S2a and S2b correspond to a non-3GPP interface. S2a is a reference point for providing associated control between the trusted non-3GPP access and the PDNGW and mobility support to a user plane. S2b is a reference point for providing associated control between the ePDG and the PDNGW and mobility support to a user plane.

Figure 2:
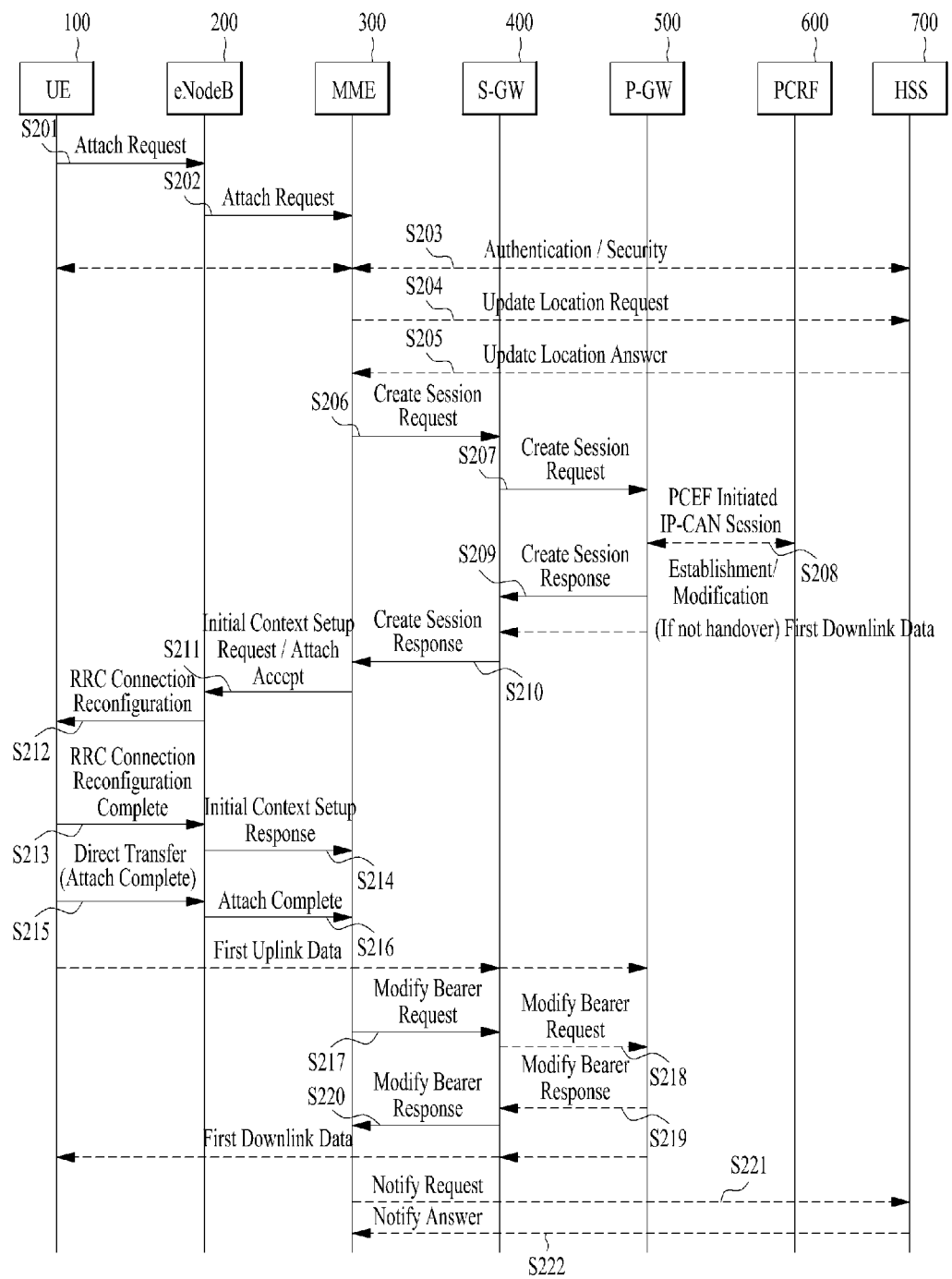
FIG. 2 is a conceptual diagram illustrating an initial attach procedure.

FIG. 2 is a conceptual diagram illustrating an initial attach procedure.

Referring to FIG. 2, in steps S201~S202, a user equipment (UE) 100 transmits an attach request message to the MME 300 so as to initiate an attach procedure. The attach request message is transferred to an MME 30 through eNode-B 200. The UE 100 may include Single Radio Voice Call Continuity (SRVCC) capability information in the attach request message.

In step S203, an authentication and NAS security setup process may be carried out so as to activate integrity protection and NAS ciphering. This step S203 is carried out in a first case in which a UE context regarding the UE 100 is not present in the network, or is carried out in a second case in which integrity protection of the attach request message transmitted at step S201 is not performed.

In step S204, MME 300 may transmit a update location request message to HSS 700. This step S204 may be performed when MME 300 is changed after the last detach of the UE 100, or may be performed when MME 300 does not include a valid subscription context of the UE 100.

In step S205, HSS 700 may transmit a update location answer message including subscriber information of the UE 100 to MME 300.

In step S206, MME 300 may select S-GW, and may allocate an EPS bearer identity for a default bearer related to UE. MME 300 may transmit a create session request message to the selected S-GW 400.

If MME requires Voice Support Match Indicator information regarding the UE 100 so as to decide an IMS voice over PS Session Supported Indication value of a PS session (or domain), MME 300 may transmit a UE Radio Capability Match Request message to eNode-B 200. The above-mentioned UE radio capability match request operation will be described later.

In step S207, S-GW 400 may generate a new entry in an EPS bearer table thereof, and may transmit a create session request message to the P-GW 500 on the basis of P-GW address information contained in the received create session request message received from MME 300.

In step S208, P-GW 500 and PCRF 600 may perform IP-CAN Session Establishment/Modification. This step S208 may be performed in case that dynamic Policy and Charging Control is deployed.

In step S209, P-GW 500 may generate a new entry in an EPS bearer context table thereof, and may transmit a Create Session Response message to S-GW 400.

If the UE is not handed over, downlink data for the UE 100 may be transferred from P-GW 500 to S-GW 400 after completion of the step S209.

In step S210, S-GW 400 may transmit a create session response message to MME 300.

In step S211, MME 300 may transmit an initial context setup request message including an attach accept message sent to the UE 100 to the eNode-B 200. The attach accept message may include IMS voice over PS Session Supported Indication information of a PS session. As described above, MME may consider one or more elements from among the following elements when deciding the IMS voice over PS Session Supported Indication value in the PS session.

'Voice over IMS' related capability information of UE:
   Voice support match indicator information and/or SRVCC capability information provided from UE
local policy
Home Public Land Mobile Network (HPLMN)
SRVCC capability of network
extends of E-UTRAN/UTRAN coverage
If UE is roaming, roaming agreement with HPLMN of UE is carried out.

In step S212, eNode-B 200 may transmit an RRC connection reconfiguration message including both the attach accept message received from MME 300 and EPS radio bearer identity information to the UE 100.

In step S213, the UE 100 may transmit an RRC connection reconfiguration complete message to the eNode-B 200.

In step S214, the eNode-B 200 may transmit an initial context setup response message to the MME 300.

In step S215, the UE 100 may transmit a direct transfer message including the attach complete message sent to the MME to the eNode-B 200.

In step S216, the eNode-B 200 may transmit the attach complete message received from the UE to the MME 300.

After completion of the step S216, the UE 100 may transmit UL data.

In step S217, MME 300 having received the initial context setup response message and the attach complete message in steps S214 and S216 may transmit the modify bearer request message to the S-GW 400.

In step S218, S-GW 400 may transmit the modify bearer request message to P-GW 500. This step S218 may be carried out when the modify bearer request message received at step S217 includes handover indication information.

In step S219, P-GW 500 may answer the S-GW 400 using the modify bearer response message.

In step S220, S-GW 400 may answer the MME 300 using the modify bearer response message. Thereafter, S-GW 400 may transfer DL data to the UE 100.

In step S221, if it is necessary to store APN, and PDN GW ID, etc. in the HSS 700 so as to support mobility for a non-3GPP access network, MME 300 may perform the HSS registration process through the notify request message.

In step S222, HSS 700 may answer the MME 300 using the notify answer message.

Figure 3:
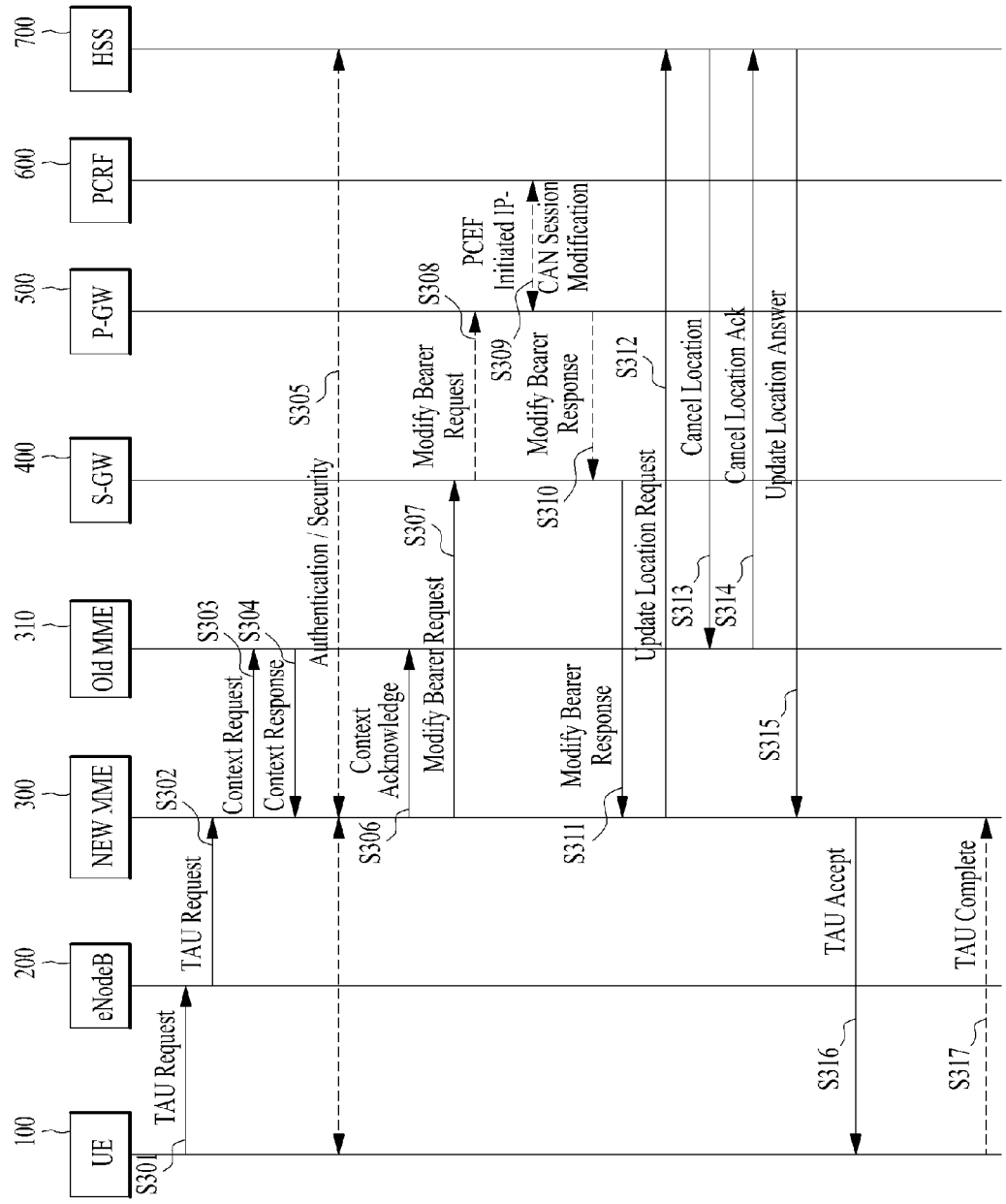
FIG. 3 is a conceptual diagram illustrating a tracking area update (TAU) procedure.

FIG. 3 is a conceptual diagram illustrating a tracking area update (TAU) procedure.

Referring to FIG. 3, in steps S301~S302, a UE 100 may transmit a Tracking Area Update Request (TAUR) message to the MME 300 so as to initiate the TAU procedure. The TAU request message may be transferred to a new MMW 300 through the eNode-B 200. The UE 100 may include SRVCC capability information in the TAU request message.

In step S303, a new MME 300 may transmit a context request message to an old MME 310 so as to acquire user information.

In step S304, the Old MME 310 may answer the new MME 300 using a context response message. The context response message may include voice support match indication information regarding the UE 100 in an MM context.

In step S305, an authentication and security setup operation may be carrier out. The step S305 may be performed when integrity protection of the TAU response message sent in step S301 is not performed.

In step S306, New MME 300 may transmit a Context Acknowledge message to the old MME 310.

In step S307, New MME 300 may transmit a modify bearer request message per PDN connection to S-GW 400.

In step S308, S-GW 400 may transmit the modify bearer request message per PDN connection to the P-GW 500. The step S308 may be carried out when S-GW 400 has to inform P-GW 500 of specific information (e.g., changed RAT type, user location information, etc.)

In step S309, P-GW 500 may perform IP-CAN session modification along with PCRF 600. This step S309 may be carried out when dynamic PCC is deployed and P-GW 500 has to provide PCRF 600 with information.

In step S310, P-GW 500 may answer S-GW 400 using the modify bearer response message.

In step S311, S-GW 400 may answer the new MME 300 using the modify bearer response message.

In step S312, New MME 300 may transmit the update location request message to HSS 700. The step S312 may be carried out when the new MME 300 does not include subscription data of the UE 100.

In step S313, HSS 700 may transmit a cancel location message to Old MME 310.

In step S314, Old MME 310 may answer HSS 700 using a Cancel Location Ack message.

In step S315, HSS 700 may transmit an Update Location Answer message including subscription information of the UE 100 to the new MME 300.

If the new MME 300 does not receive voice support match indication information from the olde MME 310 in step S304, the new MME 300 may transmit a UE radio capability match request message to the eNode-B 200 in step S316. This UE radio capability match request operation is based on the detailed description of FIG. 4. The new MME 300 may transmit a TAU accept message to the UE 100. The TAU accept message may include IMS voice over PS Session Supported Indication information in the PS session. Elements to be considered when the new MME 300 determines the IMS voice over PS Session Supported Indication value of the PS session are as shown in step S211 of FIG. 2.

In step S317, UE 100 may transmit a TAU complete message to MME 300. This step S317 may be carried out when Globally Unique Temporary Identity (GUTI) information is changed.

The update location request transferred from MME to HSS in the attach or TAU process of FIGS. 2 to 3 may include Homogeneous Support of IMS Voice Over PS Sessions information.

For example, when MME transmits the update location request (ULR) message in step S204 of FIG. 2, the update location request message may or may not include Homogeneous Support of IMS Voice Over PS Sessions information of the IMS voice according to the following four criteria i) to iv).

i) If all tracking areas (TAs) served by (or associated with) MME may homogeneously support the IMS voice over PS Session, the MME may allocate a supported value (or 1 or True) to a 'Homogeneous Support of IMS Voice Over PS Sessions' value, and this supported value (or 1 or True) may be contained in the update location request message. (This means that 'Voice over IMS' (i.e., VoLTE) is supported by all TAs served by MME)

ii) If all TAs served by (or associated with) MME do not homogeneously support the IMS voice over PS Session, MME may allocate a Not_Supported value (or 0 or False) to a 'Homogeneous Support of IMS Voice Over PS Sessions' value, and the Not_Supported value (or 0 or False) may be contained in the update location request message. (This means that all TAs served by MME do not support 'Voice over IMS' (i.e., VoLTE). In other words, all TAs served by MME can support a voice service through CS fallback (CSFB))

iii) If some TAs from among TAs served by (or associated with) MME support the IMS voice over PS Session and some other TAs do not support the IMS voice over PS Session, MME does not include a 'Homogeneous Support of IMS Voice Over PS Sessions' value in the update location request message.

iv) If it is impossible to recognize whether TAs served by (or associated with) the MME can or cannot homogeneously support the IMS voice over PS Session, MME may not include a 'Homogeneous Support of IMS Voice Over PS Sessions' value in the update location request message.

The update location request message transferred from SGSN to HSS for use in the attach or RAU (Routing Area update) process may also include Homogeneous Support of IMS Voice Over PS Sessions information.

In addition, SGSN may or may not include the Homogeneous Support of IMS Voice Over PS Sessions information when the update location request message is transferred to HSS.

i) If all tracking areas (TAs) served by (or associated with) SGSN may homogeneously support the IMS voice over PS Session, the SGSN may allocate a supported value (or 1 or True) to a 'Homogeneous Support of IMS Voice Over PS Sessions' value, and this supported value (or 1 or True) may be contained in the update location request message. (This means that 'Voice over IMS' (i.e., VoHSPA) is supported by all TAs served by SGSN)

ii) If all TAs served by (or associated with) SGSN do not homogeneously support the IMS voice over PS Session, SGSN may allocate a Not_Supported value (or 0 or False) to a 'Homogeneous Support of IMS Voice Over PS Sessions' value, and the Not_Supported value (or 0 or False) may be contained in the update location request message. (This means that all TAs served by SGSN do not support 'Voice over IMS' (i.e., VoHSPA). In other words, the UE has to use the CS voice supported by UTRAN.)

iii) If some TAs from among RAs served by (or associated with) SGSN support the IMS voice over PS Session and some other RAs do not support the IMS voice over PS Session, SGSN does not include a 'Homogeneous Support of IMS Voice Over PS Sessions' value in the update location request message.

iv) If it is impossible to recognize whether RAs served by (or associated with) the SGSN can or cannot homogeneously support the IMS voice over PS Session, MME may not include a 'Homogeneous Support of IMS Voice Over PS Sessions' value in the update location request message.

Figure 4:
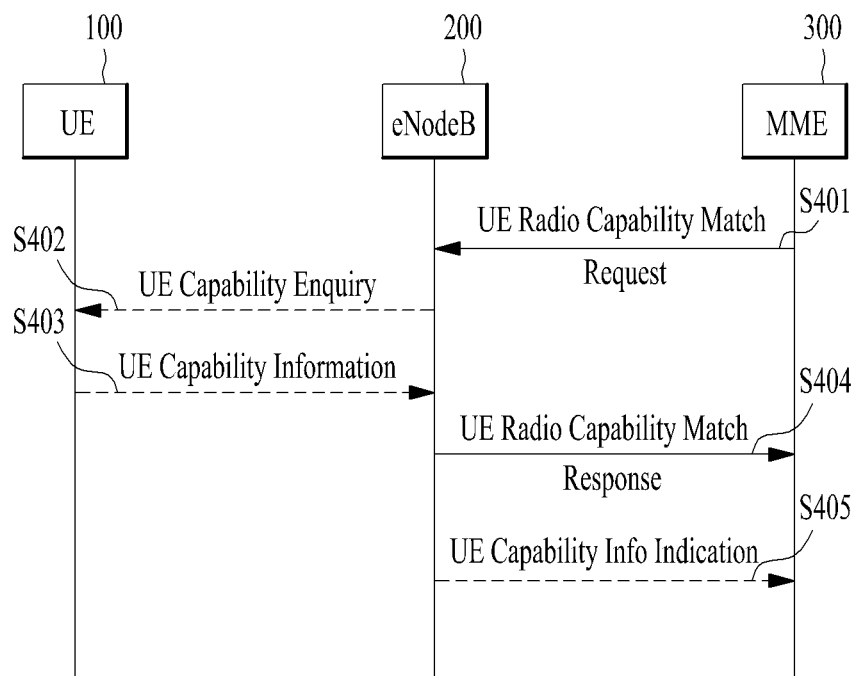
FIG. 4 is a conceptual diagram illustrating a method for enabling a serving node to acquire information of a voice support match indicator.

All TAs served by (or associated with) MME and all RAs served by (associated with) SGSN may be referred to as a service area of the serving node. Meanwhile, in the above-mentioned attach and TAU or RAU procedure, the serving node (MME or SGSN) may decide IMS voice over PS Session Supported Indication information. In this case, radio capability information of the UE may be considered. The UE radio capability information is used as Voice Support Match Indicator information, and the serving node may acquire this UE radio capability information from RAN (i.e., eNode-B or RNC). The operation for allowing the MME serving as the serving node to acquire Voice Support Match Indicator information from the eNode-B is shown in FIG. 4. The above-mentioned operation is carried out after the serving node transmits the update location request message during the attach or TAU process of the UE or before the serving node transmits the TAU accept message. A method for acquiring Voice Support Match Indicator information will hereinafter be described with reference to FIG. 4.

In step S401, MME 300 may transmit a Radio Capability Match Request message to the eNode-B 200 so as to acquire Voice Support Match Indicator information of the UE from the eNode-B 200 camped on by UE 100. In this case, if the MME 300 includes UE radio capability information received from the eNode-B 200, this UE radio capability information is contained in the UE radio capability match request message.

In step S402, if eNode-B 200 does not acquire UE radio capability information from the UE 100 or if the UE radio capability match request message received at the step 1 does not include UE radio capability information, eNode-B 200 may transmit the UE Capability Enquiry message to the UE 100 so as to acquire UE radio capability information from the UE.

In step S403, the UE 100 may transmit the UE capability information message including UE radio capability information to the eNode-B 200.

In step S404, the eNode-B 200 confirms UE radio capability information and network configuration compatibility, such that the eNode-B 200 may decide whether service continuity of a voice call initiated by IMS can be guaranteed. The eNode-B 200 may check at least one UE radio capability information for the above decision.

Single Radio Voice Call Continuity (SRVCC) capability information and UTRAN/E-UTRAN Voice over PS capability information Radio capability information for UTRAN/E-UTRAN FDD and/or TDD UTRAN/E-UTRAN frequency bands support associated information eNode-B 200 decides whether the service continuity of the IMS-initiated voice call can be guaranteed, configures a Voice Support Match Indicator value in which the decided result is reflected, and transmits the UE radio capability match response message to MME 300. If eNode-B 200 determines that service continuity of the IMS voice call can be guaranteed, the Voice Support Match Indicator value is set a 'Supported' value (or 1 or True). Otherwise, the Voice Support Match Indicator value is set a 'Not Supported' value (or 0 or False).

MME 300 may store Voice Support Match Indicator information obtained from the eNode-B 200 in a Mobility Management (MM) context of the UE. This Voice Support Match Indicator information is used when an IMS voice over PS Session Supported Indication value is decided in the PS domain for the UE 100.

In step S405, if the eNode-B 200 obtains the UE radio capability information from the UE 100 after completion of the steps S402 and S403, the eNode-B 200 may transmit the UE Capability Information (Info) Indication message including the UE radio capability information to the MME 300. MME 300 may store the received UE radio capability information. MME 300 may receive the UE capability info indication message of the step S405 at a time earlier than the UE radio capability match response message of step S404.

In case of the UE attach or RAU (Routing Area Update) process in the same manner as in MME, SGSN may consider the UE radio capability information so as to decide the IMS voice over PS Session Supported Indication value. Therefore, SGSN may perform the UE radio capability match request operation so as to acquire the UE Voice Support Match Indicator information from RNC. For a detailed description thereof, reference may be made to standard specification 3GPP TS 23.060.

In addition, when the serving node performs the attach and TAU (Tracking Area Update) or RAU (Routing Area Update)

process of the UE, UE SRVCC capability information may be considered as another information to be used when the IMS voice over PS Session Supported Indication information is decided. The UE SRVCC capability information may be used when the attach request or TAU/RAU request message is transferred from the UE to the serving node. This UE SRVCC capability information may be configured in the form of the following flag that constructs an 'MS network capability' information element(IE) of the attach request, TAU request, and RAU request messages.

SRVCC to GERAN/UTRAN capability:
0=SRVCC from UTRAN HSPA or E-UTRAN to GERAN/UTRAN not supported
1=SRVCC from UTRAN HSPA or E-UTRAN to GERAN/UTRAN supported As UE capability information to be considered when information as to whether the serving node will provide a voice service to the UE through an IMS domain is decided (i.e., when the IMS voice over PS Session Supported Indication value sent to the UE is decided), not only Voice Support Match Indicator Information received from RAN (eNodeB/RNC), but also SRVCC capability information that is provided when the UE performs the attach, TAU, and RAU operations may be used. In the present invention, the Voice Support Match Indicator and/or the SRVCC capability information provided when the UE performs the attach, TAU, and RAU operations may be referred to as 'Voice over IMS'—related capability information of the UE.

For reference, the serving node may consider all of the above two information or only one of the two information when the IMS voice over PS Session Supported Indication value is decided.

When MME decides the IMS voice over PS Session Supported Indication value, the MME may consider 'Voice over IMS' related capability information of the UE, local policy, HPLMN, SRVCC capability of the network, and extends of E-UTRAN/UTRAN coverage, etc. When SGSN decides the IMS voice over PS Session Supported Indication value, the SGSN may consider 'Voice over IMS' related capability information of the UE, local policy, HPLMN, SRVCC capability of the network, and level of E-UTRAN/UTRAN coverage, etc.

As described above, the IMS voice over PS Session Supported Indication information is signaled to the UE through a serving PLMN of the UE, and this means that the UE can successfully use the IMS voice over PS session through the serving PLMN. When the UE performs the attach or TAU operation for the MME, the UE may obtain the above information through the Attach Accept message or the Tracking Area Update Accept message. In addition, when the UE performs the attach or RAU (Routing Area Update) operation for SGSN, the UE may acquire the above information through the Attach Accept message orRAU Accept message.

Figure 5:
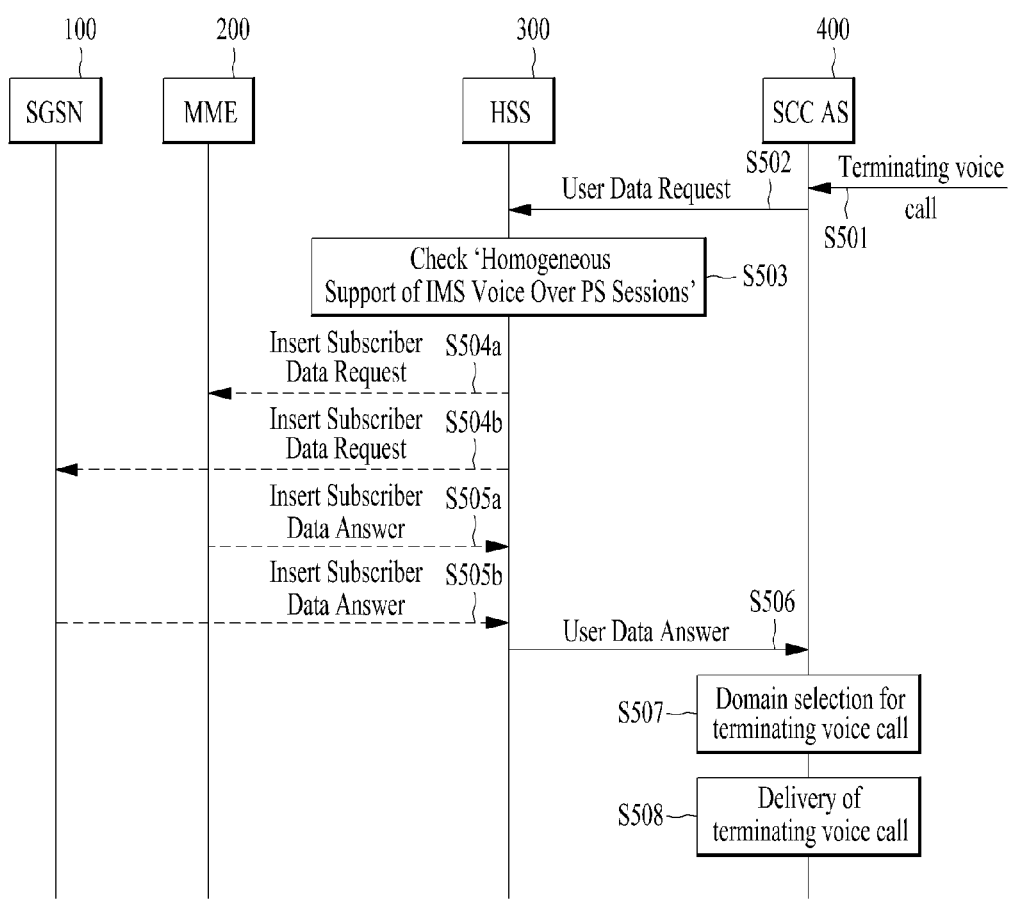
FIG. 5 is a conceptual diagram illustrating operations associated with domain selection related to a terminating voice call.

FIG. 5 is a conceptual diagram illustrating operations associated with domain selection related to a terminating voice call.

Referring to FIG. 5, if SCC AS of the IMS network receives the terminating voice call for the UE, the SCC AS transmits a query message to HSS so as to acquire 'Voice over IMS' support information of the serving network of the UE, and the HSS generates a response to the query to the SCC AS after obtaining the above information from the serving node (i.e., MME and/or SGSN) in which the UE is registered. If there is 'Homogeneous Support of IMS Voice Over PS Sessions' information received from MME or SGSN, the above querying step may be skipped over. A detailed description of the above-mentioned steps will hereinafter be described in detail.

In step S501, SCC AS 400 may receive the terminating voice call for the IMS user (i.e., IMS subscriber) served by the SCC AS 400.

In step S502, SCC AS 400 may transmit a user data request message requesting information needed for domain selection to the HSS 300 so as to select a domain through which the terminating voice call is applied to the UE. The user data request message may include a parameter for indicating that ID information (e.g., IMS Public User Identity or MSIDDN) of a receiver configured to receive the terminating voice call and information requested for HSS are needed for a terminating access domain selection (T-ADS) operation.

In step S503, HSS 300 may determine whether 'Homogeneous Support of IMS Voice Over PS Sessions' information was received from the serving node (MME and/or SGSN) of the UE belonging to a receiver of the terminating voice call. For reference, MME 200 may or may not include 'Homogeneous Support of IMS Voice Over PS Sessions' information when the update location request (ULR) request is sent to the HSS during the UE attach or TAU operation. When the ULR message is sent to HSS during the UE attach or RAU operation, SGSN may or may not include 'Homogeneous Support of IMS Voice Over PS Sessions' information.

If MMS registers as a serving node of the UE in HSS 300 and SGSN does not register in the HSS, and if HSS 300 does not receive 'Homogeneous Support of IMS Voice Over PS Sessions' information from the MME, the HSS 300 performs a step S504*a*. In contrast, if the HSS 300 receives 'Homogeneous Support of IMS Voice Over PS Sessions' information from the MME, the HSS 300 does not perform the step S504*a*. Since the SGGN is not registered in the HSS 300, the step S504*b* is not carried out.

If SGSN is registered as a serving node of the UE and MME is not registered in HSS, and if HSS 300 does not receive 'Homogeneous Support of IMS Voice Over PS Sessions' information from the SGSN, the step S504*b* is carried out. In contrast, if the HSS 300 receives 'Homogeneous Support of IMS Voice Over PS Sessions' information from the SGSN, the step S504*b* is not carried out. Since MME is not registered in HSS, the step S504*a* is not performed.

Under the condition that MME and SGSN are registered in the HSS as the serving nodes of the UE in HSS, if HSS 300 receives the Homogeneous Support of IMS Voice Over PS Sessions information from both the MME and the SGSN, and if the receives two values are identical to each other (i.e., if two values are set to either a supported value (or 1 or True) or a Not_Supported value (or 0 or False), the steps S504*a* and the step S504*b* are not carried out. Otherwise, the steps S504*a* and S504*b* are carried out.

In step S504*a*, in order to acquire information (i.e., T-ADS related information) needed for answering SCC AS 400, HSS 300 may transmit an Insert Subscriber Data Request message to the MME 200.

In step S504*b*, in order to acquire information (i.e., T-ADS related information) needed for answering SCC AS 400, HSS 300 may transmit an Insert Subscriber Data Request message to SGSN 100.

In step S505*a*, MME 200 may transmit an Insert Subscriber Data Answer message including T-ADS related information to HSS 300. The T-ADS related information may include the following information.

i) IMS-Voice-Over-PS-Sessions-Supported:
NOT_SUPPORTED (or 0 or False)=This means that the most recently used TA of a UE contained in MME does not support an IMS voice over PS Session.

SUPPORTED (or 1 or True)=This means that the most recently used TA of a UE contained in MME supports an IMS voice over PS Session.

ii) Last-UE-Activity-Time: This means a specific time at which the UE most recently performs radio contact with MME.

iii) RAT-Type: This means a Radio Access Technology (RAT) category serving a UE, for example, E-UTRAN.

In step S505b, SGSN 100 may transmit an Insert Subscriber Data Answer message including T-ADS related information to HSS 300. The T-ADS related information may include the following information.

i) IMS-Voice-Over-PS-Sessions-Supported:

NOT_SUPPORTED (or 0 or False)=This means that the most recently used RA of a UE contained in SGSN does not support an IMS voice over PS Session.

SUPPORTED (or 1 or True)=This means that the most recently used RA of a UE contained in SGSN supports an IMS voice over PS Session.

ii) Last-UE-Activity-Time: This means a specific time at which the UE most recently performs radio contact with SGSN.

iii) RAT-Type: This means a Radio Access Technology (RAT) category serving a UE, for example, UTRAN or GERAN.

In step S506, HSS 300 may transmit a User Data Answer message including T-ADS related information to SCC AS 400. The T-ADS related information may indicate whether TA or RA in which the UE is located supports the IMS voice over PS Session. In addition, if the T-ADS related information is available, the T-ADS related information may include an RAT type serving the UE, and may be based on information acquired from the serving node. HSS 300 may include T-ADS related information in the User Data Answer message.

If only MME is registered as the UE serving node in HSS and SGSN is not registered in HSS:

a) If it is determined that HSS 300 receives Homogeneous Support of IMS Voice Over PS Sessions information from MME 200 in step S503:

a-1) If the 'Homogeneous Support of IMS Voice Over PS Sessions' value is set to a supported value (or 1 or True), IMS voice over PS Session support information of the PS session is set to IMS-VOICE-OVER-PS-SUPPORTED (or 1 or True) as T-ADS related information.

a-2) If the Homogeneous Support of IMS Voice Over PS Sessions value is set to Not_Supported (or 0 or False), IMS voice over PS Session support information is set to IMS-VOICE-OVER-PS-NOT-SUPPORTED (or 0 or False) as T-ADS related information.

b) If the step S504a is performed according to the result of step S503:

T-ADS related information to be contained in the User Data Answer message is configured on the basis of T-ADS related information contained in the Insert Subscriber Data Answer message received at step S505a.

If only SGSN is registered in HSS as the UE serving node and MME is not registered in HSS:

a) If it is determined that HSS 300 receives 'Homogeneous Support of IMS Over PS Sessions' information from SGSN 100 in step S503:

a-1) If the 'Homogeneous Support of IMS Voice Over PS Sessions' value is set to a supported value (or 1 or True), IMS voice over PS Session support information of the PS session is set to IMS-VOICE-OVER-PS-SUPPORTED (or 1 or True) as T-ADS related information.

a-2) If the Homogeneous Support of IMS Voice Over PS Sessions value is set to Not_Supported (or 0 or False), IMS voice over PS Session support information is set to IMS-VOICE-OVER-PS-NOT-SUPPORTED (or 0 or False) as T-ADS related information.

b) If the step S504b is performed according to the result of step S503:

T-ADS related information to be contained in the User Data Answer message is configured on the basis of T-ADS related information contained in the Insert Subscriber Data Answer message received at step S505b.

If MME and SGSN are registered in HSS as the UE serving node:

a) If it is determined that HSS 300 receives Homogeneous Support of IMS Voice Over PS Sessions information from both MME and SGSN and the two reception information values are identical to each other:

a-1) If the Homogeneous Support of IMS Voice Over PS Sessions values received from MME and SGSN are set to Supported (or 1 or True), IMS voice over PS Session support information may be set to IMS-VOICE-OVER-PS-SUPPORTED (or 1 or True) as T-ADS related information.

a-2) If the Homogeneous Support of IMS Voice Over PS Sessions values received from MME and SGSN are set to Not_Supported (or 0 or False), IMS voice over PS Session support information of the PS session is set to IMS-VOICE-OVER-PS-NOT-SUPPORTED (or 0 or False) as T-ADS related information.

b) If the steps S504a and S504b are performed according to the result of step S503:

T-ADS related information to be contained in the user data answer message is configured on the basis of T-ADS related information acquired from the serving node in which the UE is activated at the most recent time.

In step S507, SCC AS 400 may select a domain to be used for transmission of the terminating voice call on the basis of T-ADS related information contained in the user data answer message. That is, an IMS domain (i.e., PS domain) may be selected or a CS domain may be selected.

In step S508, the terminating voice call is applied to a domain selected at step S507.

For contents related to the above domain selection and a detailed description thereof, reference may be made to standard specification 3GPP TS 23.292, TS 29.329, TS 29.328, and TS 29.272.

As described above, the conventional art does not consider 'Voice over IMS' related capability information of the UE when deciding whether Homogeneous Support of IMS Voice Over PS Sessions information will be included in the update location request (ULR) message which is transmitted to the HSS from the serving node. And the conventional art does not consider 'Voice over IMS' related capability information of the UE when deciding a value of Homogeneous Support of IMS Voice Over PS Sessions information, if Homogeneous Support of IMS Voice Over PS Sessions information is included in the ULR. Typically, serving node decides whether to include 'Homogeneous Support of IMS Voice Over PS Sessions' information and a value of 'Homogeneous Support of IMS Voice Over PS Sessions' when the Homogeneous Support of IMS Voice Over PS Sessions information is included in the ULR In case of the above-mentioned decision, 'Voice over IMS' related capability information of the UE is not considered.

In contrast, when the serving node decides whether a voice service will be provided to the UE through the IMS domain as described above (i.e., if the IMS voice over PS Session Supported Indication value applied to the UE is decided), 'Voice over IMS' related capability information of the UE is considered.

Accordingly, although the voice service is provided to the IMS domain according to the network configuration, a voice service may not be provided as the IMS domain to the UE according to 'Voice over IMS' related capability information of the UE. In this case, the serving node may provide 'Homogeneous Support of IMS Voice Over PS Sessions' information of a wrong PS session to the HSS. As a result, HSS may provide incorrect T-ADS related information to SCC AS. In other words, due to wrong T-ADS related information, SCC AS may transmit the terminating voice call to the wrongly selected domain, so that a voice call applied to the above domain is failed.

For example, due to TAU execution of the UE, a Supported value (or 1 or True) is configured in the update location request (ULR) message as the Homogeneous Support of IMS Voice Over PS Sessions value of the PS session, this supported value (or 1 or True) is sent to HSS, and it is determined that a voice service is not provided to the IMS domain according to the consideration result of the 'Voice over IMS' capability information of the UE, i.e., IMS voice over PS Session Supported Indication information of the PS domain is set to NOT_SUPPORTED (or 0 or False), such that the terminating voice call for the UE (i.e., user or subscriber to which UE belongs) may be received by SCC AS. In this case, SCC AS may transmit the user data request message requesting T-ADS related information to the HSS, and the HSS may answer the SCC AS using the user data answer message including specific information indicating that a UE-located TA supports the IMS voice over PS Session, upon receiving the Homogeneous Support of IMS Voice Over PS Sessions information from the MME. Although the UE uses the CS domain instead of the IMS domain for a voice service, HSS does not provide SCC AS with the latest correct information, such that SCC AS may select the IMS domain as an initial domain for the terminating voice call for the UE and the voice call transmission to the IMS domain fails. As a result, although the voice call transmission to the user or subscriber may be failed or the voice call transmission domain can be selected again, a time delay may occur in voice call transmission.

In brief, 'Homogeneous Support of IMS Voice Over PS Sessions' information transferred from the serving node to the HSS may be specific 'Homogeneous Support of IMS Voice Over PS Sessions' information of the PS session in which 'Voice over IMS' related capability information of the UE is not considered, specific information as to whether a voice service will be sent to the UE through the IMS domain is not considered, or IMS voice over PS Session Supported Indication information sent to the UE is not considered.

Therefore, in order to address not only the above-mentioned problem in which Homogeneous Support of IMS Voice Over PS Sessions information of the PS session does not reflect 'Voice over IMS' related capability information of the UE, but also another problem in which correct domain selection of a reception session (or an incoming session) including the IMS voice or the terminating voice call (bi-directional speech media) is failed, the present invention proposes a method for enabling the serving node to determine the Homogeneous Support of IMS Voice Over PS Sessions information sent to the HSS in consideration of 'Voice over IMS' related capability information of the UE.

In other words, the serving node may further consider the IMS voice over PS Session Supported Indication information decided in consideration of the 'Voice over IMS' related capability information of the UE, and may decide the Homogeneous Support of IMS Voice Over PS Sessions information sent to the HSS. In more detail, as described above, since IMS voice over PS Session Supported Indication information may be based on the Voice Support Match Indicator and SRVCC capability of the UE/network, the Homogeneous Support of IMS Voice Over PS Sessions information may be decided on the basis of the Voice Support Match Indicator and the SRVCC capability of the UE/network.

Continuously, MME may or may not provide the HSS with the Homogeneous Support of IMS Voice Over PS Sessions information according to the following principles. (i.e., the principles of provision or non-provision of Homogeneous Support of IMS Voice Over PS Sessions information of the MME)

i) If all TAs contained in the serving MME of the UE homogeneously support the IMS voice over PS Session for the UE, MME may set the Homogeneous Support of IMS Voice Over PS Sessions value to 'Supported' (or 1 or True), so that the resultant value is sent to the HSS. (This means that all TAs contained in MME can support 'Voice over IMS' (i.e., VoLTE) for the UE.)

ii) if all TAs contained in the serving MME of the UE do not homogeneously support the IMS voice over PS Session for the UE, MME may allocate 'Not_Supported' (or 0 or False) to the 'Homogeneous Support of IMS Voice Over PS Sessions' value, so that the resultant value is sent to the HSS. (This means that all TAs contained in MME do not support 'Voice over IMS' (i.e., VoLTE) for the UE. In other words, all TAs of the MME can support the Circuit Switched fallback (CS fallback) service for the UE.)

iii) If some TAs from among TAs of the serving MME of the UE support the IMS voice over PS Session and some other TAs do not support the IMS voice over PS Session, MME does not provide the Homogeneous Support of IMS Voice Over PS Sessions value to the HSS.

iv) If it is impossible to recognize whether TAs contained in the serving MME of the UE homogeneously support the IMS voice over PS Session, the MME does not provide the HSS with the Homogeneous Support of IMS Voice Over PS Sessions value.

Similarly to the principles of provision or non-provision of the Homogeneous Support of IMS Voice Over PS Sessions information of the MME, SGSN may or may not provide the HSS with Homogeneous Support of IMS Voice Over PS Sessions information as necessary. (i.e., the principles of provision or non-provision of Homogeneous Support of IMS Voice Over PS Sessions information of the SGSN)

i) If all TAs contained in the serving SGSN of the UE homogeneously support the IMS voice over PS Session for the UE, SGSN may set the Homogeneous Support of IMS Voice Over PS Sessions value to 'Supported' (or 1 or True), so that the resultant value is sent to the HSS. (This means that all TAs contained in SGSN can support 'Voice over IMS' (i.e., VoHSPA) for the UE.)

ii) if all RAs contained in the serving SGSN of the UE do not homogeneously support the IMS voice over PS Session for the UE, SGSN may allocate 'Not_Supported' (or 0 or False) to the 'Homogeneous Support of IMS Voice Over PS Sessions' value, so that the resultant value is sent to the HSS. (This means that all RAs contained in SGSN do not support 'Voice over IMS' (i.e., VoHSPA) for the UE. In other words, the UE has to use the CS voice service supported by UTRAN.)

iii) If some RAs from among RAs of the serving SGSN of the UE support the IMS voice over PS Session and some other TAs do not support the IMS voice over PS Session, SGSN does not provide the HSS with the Homogeneous Support of IMS Voice Over PS Sessions value.

iv) If it is impossible to recognize whether RAs contained in the serving SGSN of the UE homogeneously support the IMS voice over PS Session, the SGSN does not provide the HSS with the Homogeneous Support of IMS Voice Over PS Sessions value.

In accordance with the above-mentioned principles, the term "provide/providing/provision" may indicate that the serving node includes the Homogeneous Support of IMS Voice Over PS Sessions information in a message to be sent to the HSS, and the term "not provided/not provising/non-provision" may indicate that the serving node does not include the Homogeneous Support of IMS Voice Over PS Sessions information in a message to be sent to the HSS. This message to be transferred from the serving node to the HSS may be a legacy message (e.g., the update location request message), may be achieved by addition of information elements (e.g., Notify Request message, Insert, Subscriber Data Answer message, etc.) for storing new Homogeneous Support of IMS Voice Over PS Sessions information, or may be a message newly defined for the present invention.

In case of the above case iii), the serving node may newly define the Homogeneous Support of IMS Voice Over PS Sessions value as a specific value (such as Non_Homogeneous) newly defined for the present invention, instead of providing the Homogeneous Support of IMS Voice Over PS Sessions value to the HSS, such that the serving node may provide the HSS with the resultant value.

In case of the above case iv), the serving node may define a new defined value such as 'Unknown' of the Homogeneous Support of IMS Voice Over PS Sessions value, without providing the HSS with the Homogeneous Support of IMS Voice Over PS Sessions, such that the resultant value may be provided to the HSS.

The present invention may control the MME and SGSN to store the Homogeneous Support of IMS Voice Over PS Sessions value in the MM context of the UE. In addition, the present invention may also store specific information as to whether the Homogeneous Support of IMS Voice Over PS Sessions value stored in the MM context of the UE is provided or updated to HSS.

The embodiments of the present invention will hereinafter be described in detail.

Embodiment 1

Figure 6:
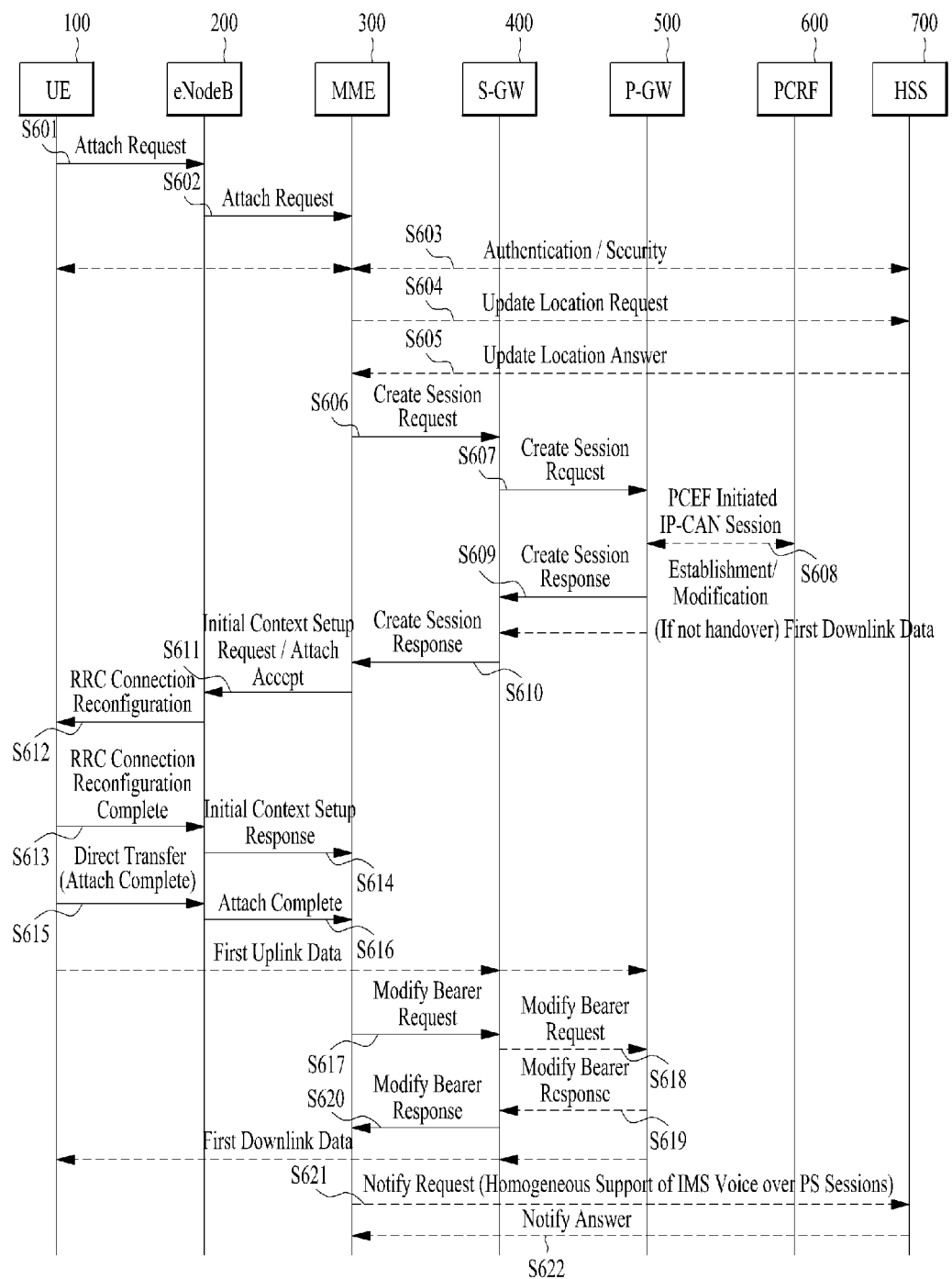
FIG. 6 is a conceptual diagram illustrating an initial attach procedure according to the embodiments of the present invention.

FIG. 6 shows the initial attach procedure according to the embodiments. The following description will focus upon steps related to application of the present invention from among a plurality of steps of FIG. 6, and a detailed description of other steps (not shown) may be replaced with the contents of FIG. 2 without departing from the scope or spirit of the present invention.

In step S604 from among the initial attach procedure, MME 300 may transmit the update location request message to the HSS 700. In this case, if the MME does not evaluate specific information as to whether the IMS voice over PS Session for the UE is supported, i.e., if the IMS voice over PS Session Supported Indication value is not decided, this Homogeneous Support of IMS Voice over PS session information is not contained in the above ULR message (i.e., transmission of the Homogeneous Support of IMS Voice over PS session information can be delayed as described in the following description.). In other words, only when MME has completely evaluated whether the IMS voice over PS Session of the UE is supported for the UE, MME decides whether the Homogeneous Support of IMS Voice Over PS Sessions information will be contained in the update location request (ULR) message.

In most cases, there is a high possibility that voice support match indication information obtained from 'Voice over IMS' related capability information of the UE to be considered by MME 300 for decision of the IMS voice over PS Session Supported Indication value at the execution time of the step S604, such that it is impossible to determine the Homogeneous Support of IMS Voice over PS session information. Accordingly, the Homogeneous Support of IMS Voice over PS session information cannot be contained in the process for transmitting the ULR message.

Alternatively, if there is no need to transmit the ULR message or if the ULR message is not transmitted, the IMS voice over PS Session Supported Indication value is decided. As a result, if it is necessary for the Homogeneous Support of IMS Voice over PS session information to be updated to HSS, MME 300 may transmit a Notify Request message instead of the ULR message to the HSS 700. The Notify Request message may or may not include the Homogeneous Support of IMS Voice Over PS Sessions information according to the principles of provision or non-provision of the Homogeneous Support of IMS Voice Over PS Sessions information of MME on the basis of the decided IMS voice over PS Session Supported Indication value. The notify request message may further include specific information indicating that this notify request message aims to update the Homogeneous Support of IMS Voice over PS session information.

If the following description is satisfied after completion of the step S604, MME 300 may transmit the notify request message for updating the Homogeneous Support of IMS Voice Over PS session information to the HSS 700. That is, if the following conditions i) and ii) are satisfied, the notify request message may be transmitted at any time after the step S604. (In FIG. 6, this step is shown in step S621 for convenience of description.)

i) MME has evaluated whether the IMS voice over PS Session is supported for the UE. That is, the IMS voice over PS Session Supported Indication value is evaluated (or decided).

ii) MME decides to update the Homogeneous Support of IMS Voice over PS Session information to HSS.

This update decision may be based on the principles of provision or non-provision of the Homogeneous Support of IMS Voice Over PS Sessions information. That is, the update decision process may include at least one of the following processes i) and ii).

i) Although MME 300 has never transmitted Homogeneous Support of IMS Voice Over PS Sessions information of the UE 100 to the HSS 700, it is determined that the Homogeneous Support of IMS Voice Over PS Sessions information should be set to 'Supported' (or 1 or True) according to the result of deciding the IMS voice over PS Session Supported Indication value. (Alternatively, although MME 300 has provided the Homogeneous Support of IMS Voice Over PS Sessions information, it is determined that this Homogeneous Support of IMS Voice Over PS Sessions information need not be provided.

ii) In this process ii), it is determined that the Homogeneous Support of IMS Voice Over PS Sessions value of the UE 100, that is transferred from MME 300 to HSS 700, is different from a newly decided Homogeneous Support of IMS Voice Over PS Sessions value. (For example, Homogeneous Support of IMS Voice Over PS Sessions information of the UE 100 is set to 'Supported' (or 1 or True) by MME 300 so that the resultant value is transferred to HSS 700, and the Homogeneous Support of IMS Voice Over PS Sessions information is set to 'Not_Supported' (or 0 or False) according to the result of deciding the IMS voice over PS Session Supported Indication value so that the resultant value is transferred to HSS 700.)

The notify request message may or may not include the Homogeneous Support of IMS Voice Over PS Sessions information according to the principles of provision or non-provision of Homogeneous Support of IMS Voice Over PS Sessions information of the MME) on the basis of the IMS voice over PS Session Supported Indication value. That is, the notify request message may include either an update state of the Homogeneous Support of IMS Voice Over PS Sessions information or updated Homogeneous Support of IMS Voice Over PS Sessions information on the basis of the decided IMS voice over PS Session Supported Indication value. The notify request message may implicitly or explicitly include specific information indicating that the notify request message aims to update the Homogeneous Support of IMS Voice over PS session information.

During transmission of the notify request message, the IMS voice over PS Session Supported Indication information and/or voice support match indication information may also be contained in this transmission process. After completion of the step S604 separately from transmission of the notify request message, if the MME decides the IMS voice PS Session Supported Indication value for the UE, the MME may transmit a message including the IMS voice over PS Session Supported Indication information and/or the voice support match indication information to the HSS.

HSS 700 may update a user (or subscriber) database (DB) related to the UE 100 on the basis of the Homogeneous Support of IMS Voice Over PS Sessions information received from MME 300, the IMS voice over PS Session Supported Indication information and/or the voice support match indication information.

In step S622, HSS 700 may answer the MME 300 using a notify answer message.

Although the notify request message and the notify answer message have been used in steps S621 and S622, the other conventional messages may be used, and a message newly defined for the present invention may also be used as necessary.

The method proposed by Embodiment 1 may be similarly applied even to the case in which the UE performs the attach operation for SGSN.

Embodiment 2

Figure 7:
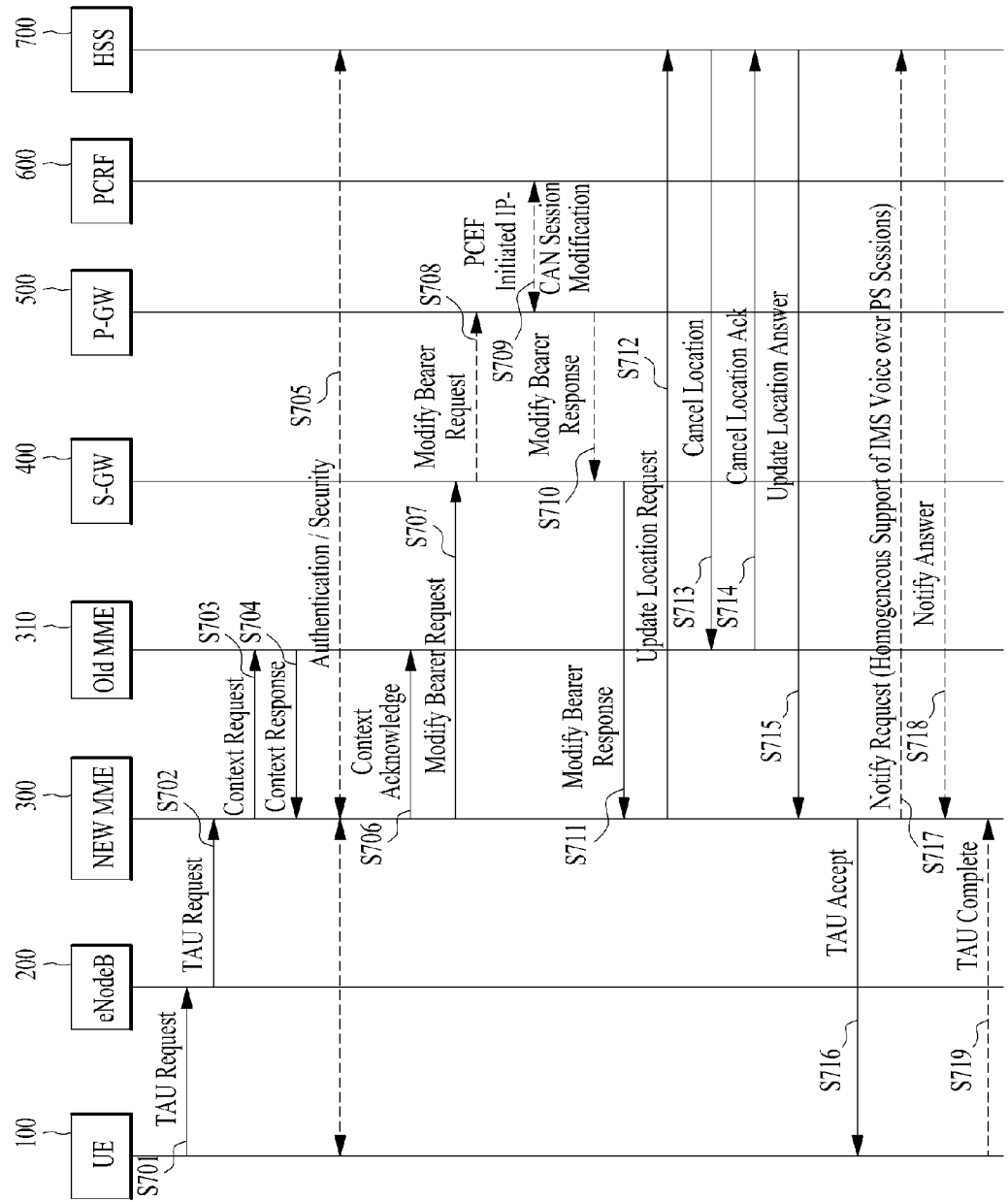
FIG. 7 is a conceptual diagram illustrating a TAU procedure according to the embodiments of the present invention.

FIG. 7 is a conceptual diagram illustrating a TAU procedure according to the embodiments of the present invention. The following description will focus upon steps related to application of the present invention from among a plurality of steps of FIG. 7, and a detailed description of other steps (not shown) may be replaced with the contents of FIG. 3 without departing from the scope or spirit of the present invention.

In step S712, New MME 300 may transmit the update location request (ULR) message to HSS 700. The step S712 is carried out when New MME 300 has no subscription data of the UE 100.

In this case, if New MME 300 does not evaluate whether an IMS voice over PS Session is supported for the UE, i.e., if the IMS voice over PS Session Supported Indication value is not decided, the Homogeneous Support of IMS Voice over PS session information is not contained in the ULR message. In other words, New MME 300 decides whether to include the Homogeneous Support of IMS Voice Over PS Sessions information in the ULR message only when specific information as to whether the IMS voice over PS Session information is supported for the UE has been evaluated.

Typically, in the above step, New MME 300 can obtain the voice support match indication information from among the 'Voice over IMS' related capability information of the UE from the Old MME 310 of step S704. Here, the UE 'Voice over IMS' related capability information is considered for decision of the IMS voice over PS Session Supported Indication value. As a result, the Homogeneous Support of IMS Voice over PS session information can be decided. According to the principles of provision or non-provision of the Homogeneous Support of IMS Voice Over PS Sessions information of MME, the Homogeneous Support of IMS Voice Over PS Sessions information may or may not be contained in the ULR message.

Optionally, if there is no need to transmit the ULR message or if the ULR message is not transmitted, or the IMS voice over PS Session Supported Indication value is decided. Thus, if it is necessary to update the Homogeneous Support of IMS Voice over PS session information to the HSS, New MME 300 may transmit the notify request message instead of the ULR message to the HSS 700. The notify request message may or may not include the Homogeneous Support of IMS Voice Over PS Sessions information according to the principles of provision or non-provision of the Homogeneous Support of IMS Voice Over PS Sessions information of MME on the basis of the decided IMS voice over PS Session Supported Indication value. The notify request message may include specific information indicating that the notify request message aims to update the Homogeneous Support of IMS Voice over PS session information.

In step S716, New MME 300 does not receive the voice support match indication information from the Old MME 310 of step S704, and the New MME 300 may transmit the UE Radio Capability Match Request message to the eNode-B 200. The UE radio capability match request message may be based on the contents of FIG. 4. New MME 300 may transmit the TAU message to the UE 100. The TAU accept message may include IMS voice over PS Session Supported Indication information. Elements to be considered when New MME 300 decides the IMS voice over PS Session Supported Indication value are identical to those of step S211 of FIG. 2.

If the following description is satisfied after completion of the step S712, New MME 300 may transmit the notify request message for updating the Homogeneous Support of IMS Voice over PS session information to the HSS 700. That is, the notify request message can be transmitted at any time after the step S712 on the condition that the following conditions are satisfied. (This operation is shown in step S717 for convenience of description)

i) MME has completely evaluated whether the IMS voice over PS Session is supported for the UE. That is, MME may evaluate (or decide) the IMS voice over PS Session Supported Indication value.

ii) It is determined that MME must update the Homogeneous Support of IMS Voice over PS session information to the HSS.

This update decision may be based on the principles of provision or non-provision of the Homogeneous Support of IMS Voice Over PS Sessions information of MME. In more detail, the update decision may include at least one of the following items.

i) Although MME 300 has never transmitted Homogeneous Support of IMS Voice Over PS Sessions information of the UE 100 to the HSS 700, it is determined that the Homogeneous Support of IMS Voice Over PS Sessions information should be set to 'Supported' (or 1 or True) according to the result of deciding the IMS voice over PS Session Supported Indication value. (Alternatively, although MME 300 has provided the Homogeneous Support of IMS Voice Over PS Sessions information, it is determined that this Homogeneous Support of IMS Voice Over PS Sessions information need not be provided.

ii) In this process ii), it is determined that the Homogeneous Support of IMS Voice Over PS Sessions value of the UE 100, that is transferred from MME 300 to HSS 700, is different from a newly decided Homogeneous Support of IMS Voice Over PS Sessions value. (For example, Homogeneous Support of IMS Voice Over PS Sessions information of the UE 100 is set to 'Supported' (or 1 or True) by MME 300 so that the resultant value is transferred to HSS 700, and the Homogeneous Support of IMS Voice Over PS Sessions information is set to 'Not_Supported' (or 0 or False) according to the result of deciding the IMS voice over PS Session Supported Indication value so that the resultant value is transferred to HSS 700.)

The notify request message may or may not include the Homogeneous Support of IMS Voice Over PS Sessions information according to the principles of provision or non-provision of Homogeneous Support of IMS Voice Over PS Sessions information of the MME) on the basis of the IMS voice over PS Session Supported Indication value. That is, the notify request message may include either an update state of the Homogeneous Support of IMS Voice Over PS Sessions information or updated Homogeneous Support of IMS Voice Over PS Sessions information on the basis of the decided IMS voice over PS Session Supported Indication value. The notify request message may implicitly or explicitly include specific information indicating that the notify request message aims to update the Homogeneous Support of IMS Voice over PS session information.

During transmission of the notify request message, the IMS voice over PS Session Supported Indication information and/or voice support match indication information may also be contained in this transmission process. After completion of the step S712 separately from transmission of the notify request message, if the MME decides the IMS voice PS Session Supported Indication value for the UE, the MME may transmit a message including the IMS voice over PS Session Supported Indication information and/or the voice support match indication information to the HSS.

HSS 700 may update a user (or subscriber) database (DB) related to the UE 100 on the basis of the Homogeneous Support of IMS Voice Over PS Sessions information received from New MME 300, the IMS voice over PS Session Supported Indication information and/or the voice support match indication information.

Although the notify request message and the notify answer message have been used in steps S717 and S718, the other conventional messages may be used, and a message newly defined for the present invention may also be used as necessary.

Although FIG. 7 shows the TAU operation in which S-GW is changed, Embodiment 2 can also be applied to the TAU operation in which S-GW is changed. The method proposed by Embodiment 2 may be similarly applied even to the case in which the UE performs the RAU operation for SGSN.

Embodiment 3

In addition to Embodiment 1, during the attach operation of the UE, the serving node may perform the UE radio capability match request operation before transmitting the update location request (ULR) message to the HSS. Referring to FIG. 6, MME 300 may perform the UE radio capability match request operation for acquiring voice support match indication information from the eNode-B 200 in step S606. Differently from Embodiment 3, the UE radio capability match request operation shown in FIG. 4 may be performed before the step S604 of FIG. 6.

In addition to Embodiment 2, during the TAU/RAU operation of the UE, the serving node may perform the UE radio capability match request operation before transmitting the ULR message to the HSS.

As described above, the serving node performs the UE radio capability match request operation before transmission of the ULR message, such that the ULR message may be transmitted to HSS (Step S604 of FIG. 6, and Step S712 of FIG. 7). In this case, the Homogeneous Support of IMS Voice Over PS Sessions information may be updated to the HSS using other conventional messages or a message newly defined for the present invention, instead of using the ULR message.

Embodiment 4

In Embodiment 1, when the serving node transmits the ULR message to the HSS during the UE attach operation, if specific information indicating whether the IMS voice over PS Session for the UE is supported is not evaluated, i.e., if the IMS voice over PS Session Supported Indication value is not decided, Homogeneous Support of IMS Voice over PS session information is not contained in the ULR message. Differently from Embodiment 1, Embodiment 4 shows that the Homogeneous Support of IMS Voice over PS session information based on the network configuration may be contained in the ULR message. Referring to FIG. 6, although MME does not decide the IMS voice over PS Session Supported Indication value in step S604, if the value of Homogeneous Support of IMS Voice over PS session information based on the network configuration is set to 'Supported' or 'Not_Supported', the Homogeneous Support of IMS Voice over PS session information based on the network configuration may be contained in the ULR message sent to the HSS.

Similarly to the above description, Embodiment 2 shows that the serving node may include Homogeneous Support of IMS Voice over PS session information based on the network configuration in the Update Location Request (ULR) message. Referring to FIG. 7, although MME does not decide the IMS voice over PS Session Supported Indication value in step S712, if the value of Homogeneous Support of IMS Voice over PS session information based on the network configuration is set to 'Supported' or 'Not_Supported', the Homogeneous Support of IMS Voice over PS session information based on the network configuration may be contained in the ULR message sent to HSS.

If the Homogeneous Support of IMS Voice Over PS Sessions information is contained in the ULR message as described above, it is possible to additionally transmit specific information indicating that the Homogeneous Support of IMS Voice Over PS Sessions value can be changed later may be changed later. Due to this additional information, although HSS has Homogeneous Support of IMS Voice Over PS Sessions information, if a message (i.e., a message for requesting user data) requesting the T-ADS related information is received from SCC AS, the step (i.e., transmission of the Insert Subscriber Data Request message) for selectively requesting T-ADS related information toward the serving node may be carried out without being skipped over.

Embodiment 5

When the serving node receives a message (i.e., the Insert Subscriber Data Request message) requesting T-ADS related information from the HSS and transmits a response to the received message, if specific information as to whether the IMS voice over PS Session is supported for the UE is evaluated, i.e., if the IMS voice over PS Session Supported Indication value is decided, contents indicating the update of Homogeneous Support of IMS Voice over PS session information are contained in the response message (i.e., Insert Subscriber Data Answer message). In order to decide whether the contents indicating the update of the Homogeneous Support of IMS Voice over PS session information will be contained in the response message, the necessity of additionally updating information to the HSS may be considered.

A detailed description thereof will hereinafter be described with reference to FIG. 8. individual steps (not shown in FIG. 8) may be replaced with those of FIG. 5.

Figure 8:
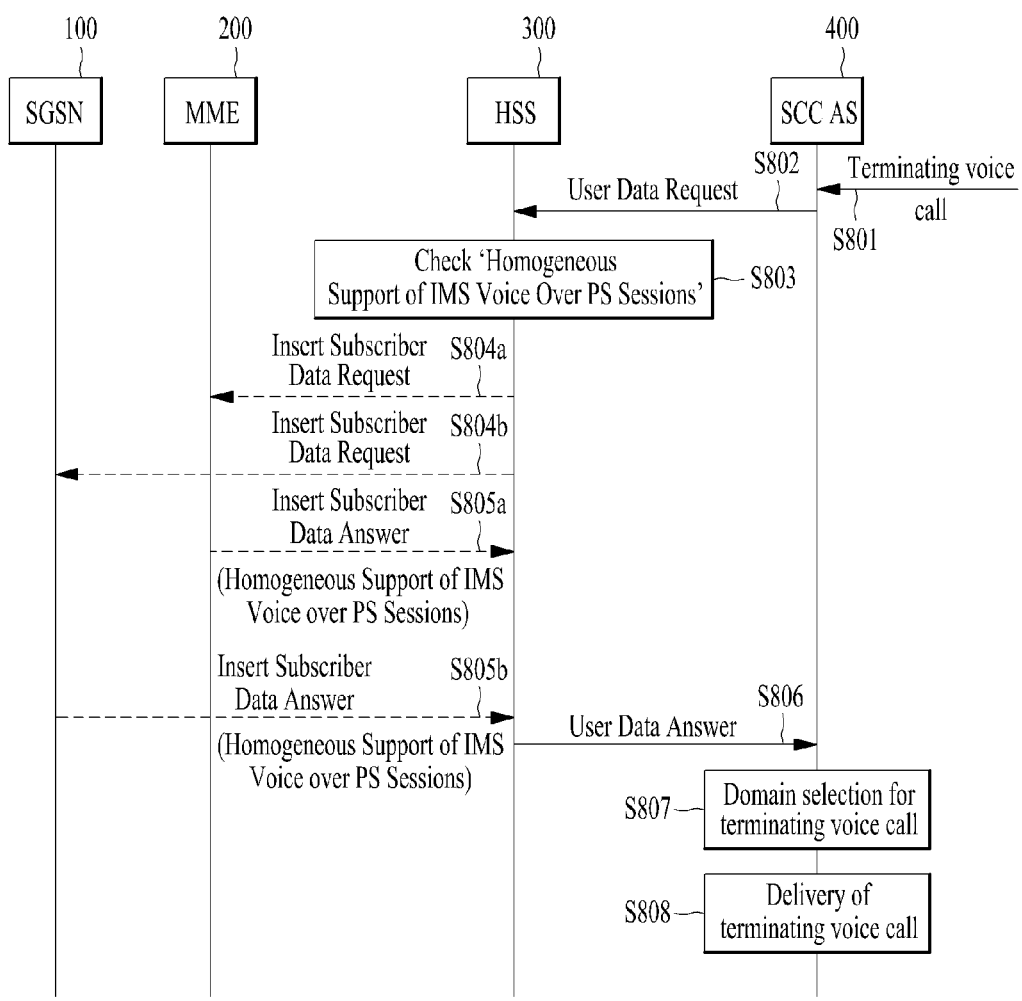
FIG. 8 is a conceptual diagram illustrating operations associated with domain selection related to a terminating voice call according to the embodiments of the present invention.

Referring to FIG. 8, after MME 200 has decided IMS voice over PS Session Supported Indication information in step S805a, according to the principles of provision or non-provision of the Homogeneous Support of IMS Voice Over PS Sessions information of MME on the basis of the decided IMS voice over PS Session Supported Indication value when the Insert Subscriber Data Answer message is transferred to the HSS 300, the Homogeneous Support of IMS Voice Over PS Sessions information may or may not be contained in the Insert Subscriber Data Answer message. That is, the Insert Subscriber Data Answer message may include either update content of the Homogeneous Support of IMS Voice Over PS Sessions information or the updated Homogeneous Support of IMS Voice Over PS Sessions information on the basis of the decided IMS voice over PS Session Supported Indication value. In addition, after the SGSN 100 has decided the IMS voice over PS Session Supported Indication information in step S805b, according to the principles of provision or non-provision of the Homogeneous Support of IMS Voice Over PS Sessions information of MME on the basis of the decided IMS voice over PS Session Supported Indication value when the Insert Subscriber Data Answer message is transferred to the HSS 300, the Homogeneous Support of IMS Voice Over PS Sessions information may or may not be contained in the Insert Subscriber Data Answer message.

The Insert Subscriber Data Answer message may implicitly or explicitly include specific information indicating update of the Homogeneous Support of IMS Voice over PS session information.

During transmission of the Insert Subscriber Data Answer message, the Homogeneous Support of IMS Voice Over PS Sessions information is updated, and IMS voice over PS Session Supported Indication information and/or voice support match indication information may be contained in this transmission process. Alternatively, instead of updating the Homogeneous Support of IMS Voice Over PS Sessions information, IMS voice over PS Session Supported Indication information and/or voice support match indication information may also be contained in the transmission process as necessary.

HSS may update an associated user (or subscriber) database (DB) on the basis of Homogeneous Support of IMS Voice Over PS Sessions information received from the serving node, IMS voice over PS Session Supported Indication information, and/or voice support match indication information.

Together with or independently of the above-mentioned contents of Embodiment 5, SCC AS may operate as follows.

SCC AS may decide whether a receiver of the terminating voice call receives an IMS based voice service (i.e., an IMS voice over PS session or a voice service of PS domain) using at least one of the following enumerated information. As information for such decision, the following information i) to v) may be used, i.e., i) information as to whether the UE registers a service having no voice in the IMS network, ii) information indicating that a subscriber or a specific UE of the subscriber from among the subscriber information does not receive the IMS based voice service, iii) UE capability information, iv) information as to whether 'Voice over IMS' of a PLMN serving the UE is supported, and v) information that is implicitly or explicitly acquired from a UE or other nodes, and/or information configured in SCC AS. In association with the above information i), in order to allow SCC AS to determine whether the UE registers a voice having no voice in the IMS network, it is possible for the UE to use information as to whether a voice (or MMTel) will (explicitly or implicitly) receive an IMS based service may be contained in the above registration process in which the UE performs registration in the IMS network. As a result, the following operations may additionally be carried out. That is, if the UE desires to receive a voice service on the basis of IMS and then desires not to receive the voice service, or if the UE desires to receive a voice service on the basis of IMS and then desires not to receive the voice service, the UE performs the IMS registration or notify request operation so as to inform the UE of the above information.

If a receiver of the terminating voice call does not receive the IMS based voice service, although SCC AS of the IMS network receives the terminating voice call for the UE, it may be determined that a query message is not sent to HSS so as to acquire 'Voice over IMS' support information of the network serving the UE.

Alternatively, if SCC AS determines that the receiver of the terminating voice call does not receive the IMS based voice service, although SCC AS of the IMS network receives the terminating voice call for the UE, it may be determined that T-ADS for selection of the terminating domain for the voice media is not carried out.

If SCC AS determines that the receiver of the terminating voice call does not receive the IMS based voice service as described above, the terminating voice call may be transferred to the CS domain. On the other hand, if SCC AS determines that the receiver of the terminating voice call receives the IMS based voice service, the terminating voice call may be transferred to the IMS domain.

Embodiment 5 may be combined with Embodiment 1 and Embodiment 2, or may also be combined with Embodiment 4 as necessary. According to the method of the present invention in which the serving node of the UE provides the HSS with T-ADS retrieval related information, for example, Homogeneous Support of IMS Voice Over PS Sessions information, IMS voice over PS Session Supported Indication information, and/or voice support match indication information, the HSS can recognize correct information associated with T-ADS although the T-ADS retrieval operation for the serving node is skipped over, or the HSS can perform the T-ADS retrieval operation for the serving node on the basis of specific information. Accordingly, information transferred from the serving node to HSS may also be configured in other formats or messages as necessary, except for Homogeneous Support of IMS Voice Over PS Sessions information, IMS voice over PS Session Supported Indication information, and voice support match indication information.

Figure 9:
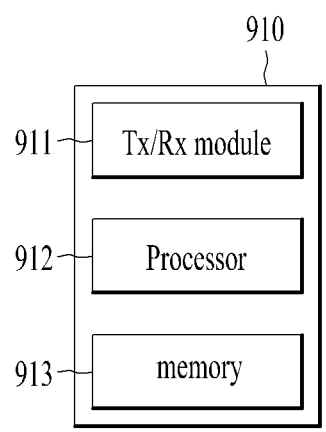
FIG. 9 is a block diagram illustrating a network node apparatus according to the embodiments of the present invention.

FIG. 9 illustrates a configuration of a transceiver according to an embodiment of the present invention.

Referring to FIG. 9, a serving node device 910 according to an embodiment of the present invention may include a transceiver (Tx/Rx) module 911, a processor 912, and a memory 913. The transceiver module 911 may be configured to transmit various signals, data and information to an external device (e.g., network node (not shown), server device (not shown), and/or a UE (not shown)), and may also be configured to receive various signals, data and information from the external device (e.g., network node (not shown), server device (not shown), and/or a UE (not shown)). The processor 912 may control overall operation of the serving node 910, and may be configured to execute a function of processing information communicated between the serving node 910 and the external device. The memory 913 may store the processed information for a predetermined time and may be replaced by a component such as a buffer (not shown).

The processor of the serving node 910 according to the embodiments transmits an update location request (ULR) message to a home subscriber server (HSS). If the serving node does not evaluate the IMS voice over PS Session Supported Indication value for the UE, the ULR message may not include the Homogeneous Support of IMS Voice over PS session information. In addition, the processor may process operations needed for the embodiments of the present invention.

The specific configurations of the serving node 910 may be implemented such that the various embodiments of the present invention are performed independently or two or more embodiments of the present invention are performed simultaneously. Redundant matters will not be described herein for clarity.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

Industrial Applicability

The embodiments of the present invention can be applied to a variety of mobile communication systems.

The invention claimed is:

1. A method for supporting a voice service of a user equipment (UE) of a network in a wireless communication system, the method comprising:
    transmitting an update location request (ULR) message to a home subscriber server (HSS) by a serving node,
    wherein if the serving node knows a homogeneity of support of IMS (IP multimedia subsystem) voice over PS (packet-switched) session in all TAs (Tracking areas) or all RAs (Routing Areas) related to the serving node, the ULR message includes 'Homogeneous Support of IMS Voice over PS Session' information element, and
    wherein if the serving node fails to know the homogeneity of support of IMS voice over PS session due to lack of information including Voice over IMS related capability information of UE, the ULR message does not include 'Homogeneous Support of IMS Voice over PS Session' information element.

2. The method according to claim 1, wherein the homogeneity of support of IMS voice over PS session is decided in consideration of the information including Voice over IMS related capability information of the UE.

3. The method according to claim 2, wherein the Voice over IMS capability information includes at least one of a voice support match indicator and single radio voice call continuity (SRVCC) capability information.

4. The method according to claim 1, wherein if the ULR message does not include 'Homogeneous Support of IMS Voice over PS Session' information element, the 'Homogeneous Support of IMS Voice over PS Session' information element is included in a Notify Request message transferred from the serving node to the HSS.

5. The method according to claim 1, wherein:
    if the IMS voice over PS session is equally supported for the UE in a service area of the serving node, a value of the 'Homogeneous Support of IMS Voice over PS Session' information element is set to a supported state (Supported).

6. The method according to claim 1, wherein:
    if the IMS voice over PS session is not equally supported for the UE in a service area of the serving node, a value of the 'Homogeneous Support of IMS Voice over PS Session' information element is set to a not_supported state (Not_Supported).

7. The method according to claim 1, wherein:
    if the IMS voice over PS session is supported only in some regions from among service regions of the serving node for the UE, the 'Homogeneous Support of IMS Voice over PS session' information element is not considered by the serving node.

8. The method according to claim 1, wherein:
    if it is impossible to support the IMS voice over PS session in a service region of the serving node for the UE, the 'Homogeneous Support of IMS Voice over PS session' information element is not considered by the serving node.

9. The method according to claim 1, wherein the 'Homogeneous Support of IMS Voice over PS session' information element is stored in a Mobility Management (MM) context of the serving node.

10. The method according to claim 1, wherein the ULR transmission step is contained in any one of an attach procedure of the UE, a Tracking Area Update (TAU) of the UE, or a Routing Area Update (RAU) procedure of the UE.

11. The method according to claim 1, wherein the serving node is any one of a Mobility Management Entity (MME) and a Serving GPRS Support Node (SGSN).

12. The method according to claim 5, wherein, if the serving node is a Mobility Management Entity (MME), the service region of the serving node includes all tracking areas (TAs) associated with the MME.

13. The method according to claim 5, wherein, if the serving node is a Serving GPRS Support Node (SGSN), the service region of the serving node includes all routing areas (RAs) associated with the SGSN.

14. The method according to claim 1, wherein the Homogeneous Support of IMS Voice over PS session information is used to select a domain of a terminating voice call for the UE.

15. A serving node apparatus for use in a wireless communication system, the serving node apparatus comprising:

a transceiver module; and a processor, wherein the processor transmits an update location request (ULR) message to a home subscriber server (HSS) by a serving node, wherein if the serving node knows a homogeneity of support of IMS (IP multimedia subsystem) voice over PS (packet-switched) session in all TAs (Tracking areas) or all RAs (Routing Areas) related to the serving node, the ULR message includes 'Homogeneous Support of IMS Voice over PS Session' information element, and wherein if the serving node fails to know the homogeneity of support of IMS voice over PS session due to lack of information including Voice over IMS related capability information of UE, the ULR message does not include 'Homogeneous Support of IMS Voice over PS Session' information element.

* * * * *